(12) United States Patent
Donsbach et al.

(10) Patent No.: US 9,244,940 B1
(45) Date of Patent: Jan. 26, 2016

(54) NAVIGATION PATHS FOR PANORAMA

(71) Applicant: Google Inc., Mountain View, CA (US)

(72) Inventors: Aaron Michael Donsbach, Seattle, WA (US); John Isidoro, San Jose, CA (US); Jeffrey Scott Beis, Palo Alto, CA (US); Evan Rapoport, Los Altos, CA (US); Ping Hsin Chen, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/084,077

(22) Filed: Nov. 19, 2013

Related U.S. Application Data

(60) Provisional application No. 61/883,576, filed on Sep. 27, 2013.

(51) Int. Cl.
*G06F 17/30* (2006.01)
*G06T 11/20* (2006.01)

(52) U.S. Cl.
CPC .......... *G06F 17/30241* (2013.01); *G06T 11/20* (2013.01)

(58) Field of Classification Search
USPC .................................................... 707/E17.02
See application file for complete search history.

(56) References Cited

U.S. PATENT DOCUMENTS

| | | | |
|---|---|---|---|
| 6,199,014 B1 | 3/2001 | Walker et al. | |
| 6,351,710 B1 | 2/2002 | Mays | |
| 6,437,797 B1 | 8/2002 | Ota | |
| 7,096,428 B2 | 8/2006 | Foote et al. | |
| 7,746,376 B2 | 6/2010 | Mendoza et al. | |
| 7,810,037 B1 | 10/2010 | Edwards et al. | |
| 7,873,468 B2 | 1/2011 | Matsuura et al. | |
| 8,015,172 B1 | 9/2011 | Cave et al. | |
| 8,073,461 B2 | 12/2011 | Altman et al. | |
| 8,131,118 B1 | 3/2012 | Jing et al. | |
| 8,493,408 B2 | 7/2013 | Williamson et al. | |
| 2001/0010546 A1 | 8/2001 | Chen | |
| 2002/0122073 A1 | 9/2002 | Abrams et al. | |

(Continued)

FOREIGN PATENT DOCUMENTS

| | | |
|---|---|---|
| EP | 1404105 A2 | 3/2004 |
| JP | H10126731 A | 5/1998 |

OTHER PUBLICATIONS http://web.archive.org/web/20131011105523/http://en.wikipedia.org/wiki/Travelling_salesman_problem, archived on Oct. 11, 2013.*

(Continued)

*Primary Examiner* — Mark Zimmerman
*Assistant Examiner* — Nurun N Flora
(74) *Attorney, Agent, or Firm* — Lerner, David, Littenberg, Krumholz & Mentlik, LLP

(57) ABSTRACT

Aspects of the disclosure relate generally to allowing users to create their own image navigation experiences. As an example, a set of panoramic images may be identified using manual and/or automated methods. One or more suggested potential paths connecting ones of the panoramic images may be determined. This information may be displayed to a user with an interface that allows the user to create and change relationships between the panoramic images. For example, users may activate the suggested paths and create connections between the panoramic images of the set. Users may also draw their own connecting paths between panoramic images. The panoramic images and the connections between them may be used to provide a navigation experience.

20 Claims, 26 Drawing Sheets

(56) References Cited

U.S. PATENT DOCUMENTS

| | | | |
|---|---|---|---|
| 2002/0128766 A1* | 9/2002 | Petzold et al. | 701/201 |
| 2004/0064338 A1 | 4/2004 | Shiota et al. | |
| 2006/0253781 A1 | 11/2006 | Pea et al. | |
| 2006/0271691 A1 | 11/2006 | Jacobs et al. | |
| 2007/0198182 A1 | 8/2007 | Singh | |
| 2008/0033641 A1 | 2/2008 | Medalia | |
| 2008/0118184 A1 | 5/2008 | Panabaker et al. | |
| 2008/0215964 A1 | 9/2008 | Abrams et al. | |
| 2009/0135178 A1* | 5/2009 | Aihara et al. | 345/419 |
| 2009/0307222 A1 | 12/2009 | Matraszek et al. | |
| 2010/0082194 A1* | 4/2010 | Yabushita et al. | 701/25 |
| 2010/0146397 A1* | 6/2010 | Koch et al. | 715/739 |
| 2010/0259641 A1 | 10/2010 | Fujimoto | |
| 2010/0325589 A1 | 12/2010 | Ofek et al. | |
| 2011/0118974 A1 | 5/2011 | Chang et al. | |
| 2011/0131597 A1 | 6/2011 | Cera et al. | |
| 2011/0196897 A1 | 8/2011 | Koch et al. | |
| 2011/0211040 A1 | 9/2011 | Lindemann et al. | |
| 2011/0212717 A1 | 9/2011 | Rhoads et al. | |
| 2011/0231745 A1 | 9/2011 | Levesque et al. | |
| 2011/0280497 A1 | 11/2011 | Berger et al. | |
| 2011/0283210 A1 | 11/2011 | Berger et al. | |
| 2012/0033032 A1 | 2/2012 | Kankainen | |
| 2012/0039546 A1 | 2/2012 | Berger et al. | |
| 2012/0059720 A1 | 3/2012 | Musabji et al. | |
| 2012/0066573 A1 | 3/2012 | Berger et al. | |
| 2012/0082401 A1 | 4/2012 | Berger et al. | |
| 2012/0092266 A1* | 4/2012 | Akella | 345/173 |
| 2012/0141023 A1 | 6/2012 | Wang et al. | |
| 2012/0246562 A1 | 9/2012 | Maness et al. | |
| 2012/0324373 A1 | 12/2012 | Halliday et al. | |
| 2013/0018574 A1* | 1/2013 | Adler | 701/408 |
| 2013/0090850 A1 | 4/2013 | Mays | |
| 2013/0103303 A1 | 4/2013 | Lynch | |
| 2013/0151597 A1 | 6/2013 | Akiya et al. | |
| 2013/0191359 A1 | 7/2013 | Meadow et al. | |
| 2013/0332856 A1 | 12/2013 | Sanders et al. | |
| 2014/0330814 A1 | 11/2014 | LI | |

OTHER PUBLICATIONS

"Google Business Photos Trusted Agency Training", [online], retrieved Oct. 2, 2013, <https://sites.google.com/google.com/trusted-agency-training/en/pano-editor>, 23 pages.
"Kolor Panotour Pro", [online], retrieved Nov. 13, 2013, <http://www.kolor.com/panotour-pro-profesionnal-360-virtual-tour-software-home.html>, 1 page.
"Panotour Pro Documentation", [online], retrieved Nov. 13, 2013, <http://www.autopano.net/wiki-entaction/view/Panotour_Pro_Documentation>, 2 pages.
"Building a Tour (Pano2VR)" [online], retrieved May 5, 2014, <http://ggnome.com/wiki/building_a_Tour_(Pano2VR)>, 14 pages.
"Easypano the Virtual Tour Way" [online], Copyright 2001-2014, <http://www.easypano.com/video-tutorial/>, 1 page.
"Google Earth Outreach Storytelling with maps using Tour Builder", [online], retrieved May 5, 2014, <https://www.google.com/earth/outreach/tutorials/tourbuilder.html>, 38 pages.
"Google Earth Showcase", [online], retrieved May 5, 2014, <https://www.google.com/earth/explore/showcase/>, 5 pages.
"Imagery and Street View Overview" [online], Copyright 2014, <https://support.google.com/maps/answer/3093457?hl=en&rd=1>, 2 pages.
"Take 100,000 more tours inside Google Earth", Jan. 30, 2013, <https://www.cnet.com/news/take-100000-more-tours-inside-google-earth/>, 3 pages.
"Tour Builder", [online], Copyright 2013, <https://tourbuilder.withgoogle.com/about/faq>, 1 page.
"Using Tours" [online], Copyright 2014, <https://support.google.com/earth/answer/148174?hl=en>, 4 pages.
Jeremy Pack, Finding the Best Panoramas, Fall 2011, 5 pages.
Boult, et al., "Omnidirectional Video Applications", VAST Lab, copyright 2000.
Foote, et al., "FlyCam: Practical Panoramic Video and Automatic Camera Control", FX Palo Alto Laboratory, Inc., copyright 2000, pp. 1419-1422.
Kang, et al., "Virtual Navigation of Complex Scenes using Clusters of Cylindrical Panoramic Images", copyright 1998.
Chen, B. et al. (2009). Integrated Videos and Maps for Driving Directions. User Interface Science and Technology (Proceedings of UIST 2009), 9 pages. Retrieved from <http://research.microsoft.com/en-us/um/people/cohen/vdd_webpage/>.
Bradley, D. et al. (Oct. 1-2, 2005). Image-Based Navigation in Real Environments Using Panoramas. IEEE International Workshop on Haptic Audio Environments and their Applications (HAVE'2005)—HAVE Manuscript 20. National Research Council of Canada, 5 pages.
Zhao, Q. et al. (Dec. 2013). Cube2Video: Navigate Between Cubic Panoramas in Real-Time. IEEE Transactions on Multimedia, vol. 15, No. 8, pp. 1745-1754.
Google Street View Hyperlapse. (© 2013). Teehan+Lax Labs. This web application can be accessed at: <http://hyperlapse.tllbs.io/>.
Google Street View and Driving Directions. Google Driving View. (© 2011). RedTree Software. This web application can be accessed at: <http://www.redtreesoft.com/Google/GoogleDrivingView.htm>.
"Microsoft Photosynth: Home," photosynth.net, copyright Microsoft 2008, accessed at accessed on Mar. 22, 2013, 1 p.
3D Photo Walls: Amazing new way to scan hundreds of images in seconds, copyright VenueView Inc. 2010, accessed at http://venueview.com/3d-photo-wall/, accessed on Sep. 28, 2012,5 pages.
Debevec, Paul E., "View-Dependent Texture Mapping," in Modeling and Rendering Architecture from Photographs, Chapter 6, pp. 81-95, thesis submitted to Computer Science faculty of U.c. Berkeley, United States (Fall 1996).
Fischler, M.A., and Bolles, rCc., "Random Sample Consensus: A Paradigm for Model Fitting with Applications to Image Analysis and Automated Cartography," Jun. 1981, vol. 24, No. 6, pp. 381-395.
O'Connor, Tim, "Make a 3D Photo Tour with Live Search Maps," published Apr. 15, 2008, Windows Live Photo & Video Blog: Official blog for the Windows Live Digital Memories Experience team, blogs. MSDN.com, accessed at http://blogs.msdn.com/b/pix/archive/2008/04/15/make-a-3 d-photo-tour-with-live-.
Snavely, et al., "Photo Tourism: Exploring Photo Collections in 3D," ACM Transactions on Graphics 25(3), Association for Computing Machinery, Inc., United.
Szeliski, R., "Image Alignment and Stitching: A Tutorial," Foundations and Trends® in Computer, Computer Graphics and Vision, vol. 2, No. 1, 2006, pp. 1-104.

\* cited by examiner

NAVIGATION PATHS FOR PANORAMA

CROSS-REFERENCE TO RELATED APPLICATIONS

The present application claims the benefit of the filing date of U.S. Provisional Patent Application No. 61/883,576 filed Sep. 27, 2013, the disclosure of which is hereby incorporated herein by reference.

BACKGROUND

Various systems may provide users with images of different locations. Some systems provide users with panoramic images. For example, panoramas may include an image or collection of images having a field of view which is greater than that of the human eye, e.g., 180 degrees or greater. Some panoramas may provide a 360-degree view of a location.

Some systems may allow users to view images in sequences, such as in time or space. In some examples, these systems can provide a navigation experience in a remote or interesting location. Some systems allow users to feel as if they are rotating within a virtual world by clicking on the edges of a displayed portion of a panorama and having the panorama appear to "rotate" in the direction of the clicked edge.

SUMMARY

Aspects of the disclosure provide computer-implemented method. The method includes identifying, by one or more computing devices, a set of panoramic images, each panoramic image of the set of panoramic images being associated with geographic location information; determining, by the one or more computing devices, one or more suggested potential paths connecting two or more of the panoramic images based on the geographic location information associated with each of the two or more panoramic images; providing for display, by the one or more computing devices, a view including a map, a map marker for each panoramic image of the set, and the one or more suggested potential paths, the map markers being displayed at locations on the map that are determined based at least in part on using the geographic location information; after providing for display the view, receiving, by the one or more computing devices, user input connecting two of the panoramic images of the set of panoramic images; and generating, by the one or more computing devices, navigation data for a navigation experience, the navigation data including the two panoramic images of the set of panoramic images and a navigation connection between the two panoramic images.

In one example, the method also includes identifying a particular panoramic image of the set of panoramic images as a reference panoramic image, and the one or more suggested potential paths are determined such that they extend between the map marker of the reference panoramic image and a map marker of a panoramic image of the set of panoramic images different from the map marker of the reference panoramic image. In one example, one or more suggested potential paths are determined further based on an angular distance between panoramic images of the set of panoramic images relative to the map marker of the reference panoramic image. In another alternative, the method also includes receiving identification of a second panoramic image of the set of panoramic images as a new reference panoramic image, and determining, by the one or more computing devices, one or more new suggested potential paths connecting the map marker of the new reference panoramic image and a map marker of a panoramic image of the set of panoramic images different from the map marker of the new reference panoramic image. In another alternative, the method also includes receiving user input indicating updated geographic location information of a particular map marker of the set of panoramic images different from the map marker of the reference panoramic image; associating, by the one or more computing devices, the received updated geographic location information with the particular map marker; determining, by the one or more computing devices, a new suggested potential path connecting the map marker of the reference panoramic image and the particular map marker; and updating the display of the view with the new suggested potential path and the updated geographic location information of the particular map marker.

In another example, each of the panoramic images of the set of panoramic images are associated with timestamp information and the one or more suggested potential paths are determined further based on the timestamp information. In another example, the user input indicates that the user has drawn a line between the map markers of the two of the panoramic images of the set of panoramic images, and the method further comprises generating the navigation connection based on the user input. In another example, the user input indicates that the user has activated one of the suggested potential paths, and the method further comprises generating the navigation connection based on the user input. In another example, the method also includes receiving, from a client computing device, a request for a navigation experience and sending, to the client computing device, the navigation data for display as a navigation experience.

In another example, the method also includes receiving, from a client computing device, a request for a navigation experience and sending, to the client computing device, a panoramic image based on the navigation data. In this example, the method also includes receiving, from a client computing device, a navigation request to move to another panoramic image and sending, to the client computing device, a second panoramic image based on the navigation data.

In another example, identifying the set of panoramic images further includes receiving user input selecting individual panoramic image of the set of panoramic images. In this example, the method also includes in response to receiving user input selecting a particular panoramic image, generating a notification that the particular panoramic image is not available for connections to other images. Alternatively, the method also includes displaying a second view including a plurality of panoramic images and, in response to receiving user input selecting a given panoramic image of the plurality of panoramic images that is also in the set of panoramic images, indicating whether any of the plurality of panoramic images is available. In this example, the method also includes determining whether any of the plurality of panoramic images is available based on timestamp information associated with each of the plurality of panoramic images. Alternatively, the method also includes determining whether any of the plurality of panoramic images is available based on geographic location information associated with each of the plurality of panoramic images.

In one example, the method also includes determining the set of panoramic images based on the geographic location information associated with each panoramic image of the set of panoramic images and providing a notification that the set of panoramic images are available for connection, where identifying the set of panoramic images is further based on user input received in response to the notification. In another example, the method also includes displaying a second view including a second map, the second map including a plurality of markers, each marker of the plurality of markers representing a panoramic image, and identifying the set of panoramic images is further based on the panoramic images represented by the plurality of markers in the second view. In another example, the method also includes displaying a second view including a second map at a first zoom level, the second map including a plurality of markers, each marker of the plurality of markers representing a panoramic image; in response to user input, displaying a third map at a predetermined zoom level in the second view, the third map including a second plurality of markers, each marker of the second plurality of markers representing a panoramic image; and when the third map is displayed at the predetermined zoom level, providing a notification that the set of panoramic images are available for connection, where identifying the set of panoramic images is further based on user input received in response to the notification. In this example, identifying the set of panoramic images is further based on the panoramic images represented by the second plurality of markers.

Another aspect of the disclosure provides a computer-implemented method. The method includes identifying, by one or more computing devices, a set of panoramic images, each panoramic image of the set of panoramic images being associated with geographic location information; identifying, by one or more computing devices, a reference panoramic image of the set of panoramic images; providing for display, by the one or more computing devices, a view including a map, a map marker representing each panoramic image of the set, a representation of the reference panoramic image, and one or more reference markers, each reference marker indicating a relationship between the reference panoramic image and a panoramic image of the set of panoramic images represented by the reference map marker, the map markers being displayed on the map using the geographic location information, and the one or more reference markers being displayed with the representation of the reference panoramic image; receiving, by the one or more computing devices, user input indicating a change to a location of a particular map marker; determining, by the one or more computing devices, a corresponding change to the reference marker that represents a same panoramic image as the particular map marker, based on the user input; and updating, by the one or more computing devices, the view based on the user input and the corresponding change.

In one example, the method also includes receiving second user input indicating a change to a particular reference marker; determining a corresponding change to the map marker that represents a same panoramic image as the particular reference marker based on the second user input; and updating the view based on the second user input and the corresponding change. In another example, updating the view includes moving the map marker that represents a same panoramic image as the particular reference marker based on the second user input around the map marker that represents the reference panoramic image. In another example, providing for display the view further comprises providing for display the map marker that represents the reference panoramic image differently from the other map markers.

In another example, receiving second user input to change the representation of the reference panoramic image and in response to receiving the second user input, providing for display the representation of the reference panoramic image in a test mode for previewing a first viewing angle of the reference panoramic image, the first viewing angle corresponding to a viewing angle of the reference panoramic image for a navigation experience. In this example, the method also includes, in response to receiving the second user input, providing for display an orientation indicator with the map marker representing the reference panoramic image, wherein the orientation indicator corresponds to the first viewing angle. In addition, the method also includes receiving third user input to navigate in the representation of the reference panoramic image and, in response to receiving the third user input, providing for display the representation of the reference panoramic image at a second viewing angle different from the first viewing angle. In addition, the method also includes, in response to receiving the third user input, updating the displayed orientation indicator based on the second viewing angle.

Additional aspects of the disclosure provide systems including one or more computing devices configured to perform the methods described above. Further aspects of the disclosure provide non-transitory, tangible computer-readable storage devices on which computer readable instructions of a program are stored. The instructions, when executed by one or more processors, cause the processors to perform the methods described above.

DETAILED DESCRIPTION

Overview

Figure 1:
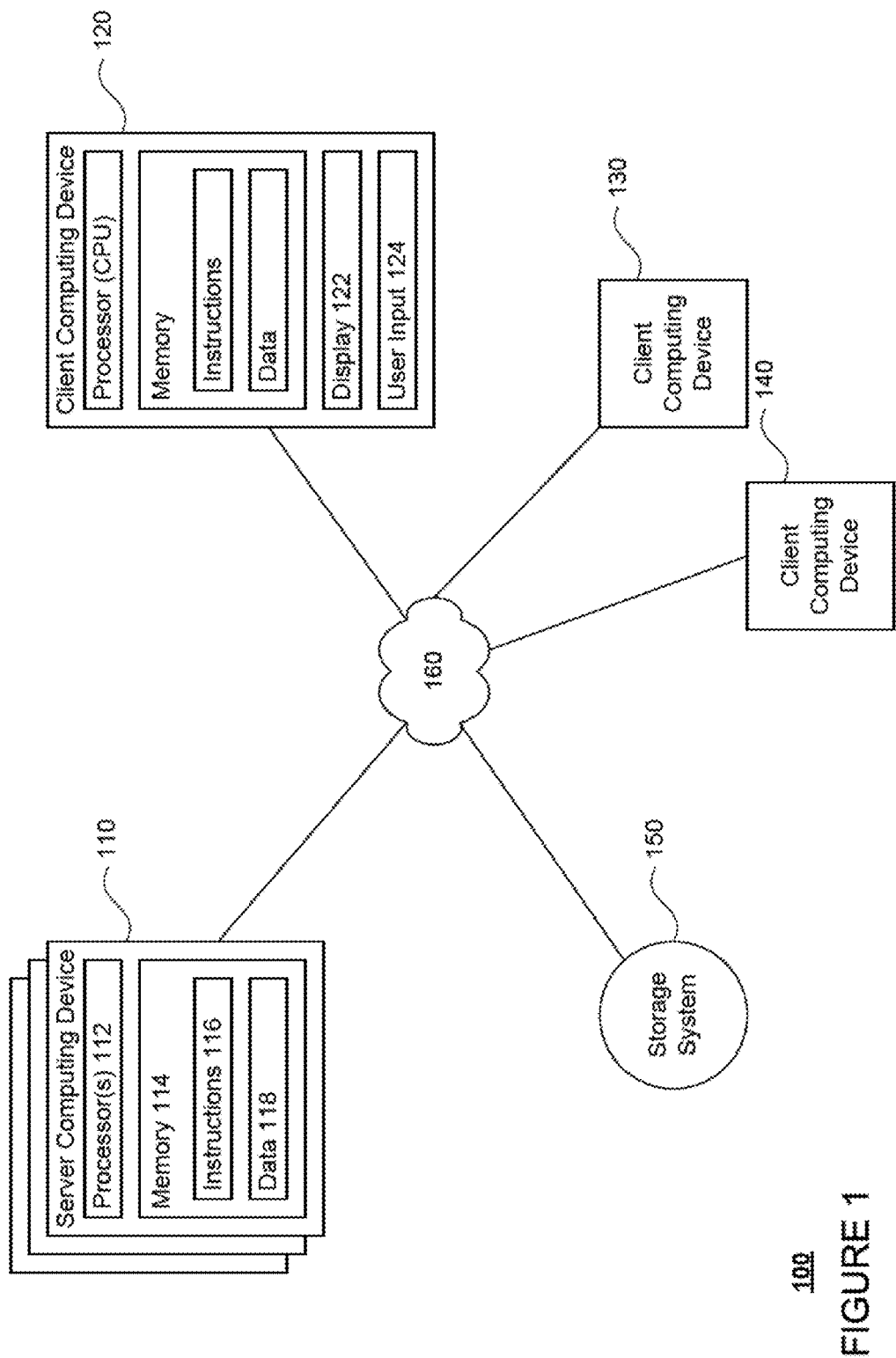
FIG. 1 is a functional diagram of an example system in accordance with aspects of the disclosure.

Aspects of the technology relate to allowing users to create their own image navigation experiences using panoramic images. For example, a user may access a gallery of panoramic images and, using one or both of manual or automated selection techniques, identify a logical and practical set of panoramic images to be connected together. The user may then connect this set of panoramic images together to create a constellation, or an interconnected graph, of panoramic images. This constellation, including the panoramic images and any connections between them, that may be used to provide the user and/or other people with a navigational experience. For example, the constellation may provide a map representation of the geographic locations of panoramic images and the connections between them. When viewing the panoramic images in a navigation experience, these connections may allow a user to experience the feeling of walking through the set of panoramic images as if the user were actually moving through the physical space of those panoramic images.

For example, a user may be able to view a set of panoramic images in a location-based sequence using the connections of the constellation. For example, a user may navigate through a virtual tour by clicking on an area of a first panoramic image and receiving a second panoramic image that is related in time or space to that first panoramic image. This may provide the user with the feeling of touring a location such as the interior of a home for sale, a museum, an outdoor location, etc. Using the example of a home, one panorama may capture a hallway. If the user is oriented towards one end of the hallway, the user may next be shown an image of a room at that end of the hallway.

In order to connect panoramic images and create a constellation, the user may access his or her panoramic images and make a selection to connect panoramic images in a constellation. Once the user has selected one or more images for a constellation, the client computing device may automatically make other panoramic images available or unavailable for inclusion in that constellation. When the user has completed his or her selection of panoramic images for a given constellation, the images may then be connected.

Alternatively, rather than selecting panoramic images individually, the user may receive recommendations for possible groups of panoramic images to be connected. For example, panoramic images may be pre-grouped in sets for connections based on the locations where the panoramic images were captured and/or the time of capture.

In another example, the user may select a set of panoramic images to be connected based a map view of the user's panoramic images. For example, if the map view is at a particular zoom level showing images within some visual or spatial proximity to one another, the user may be able to connect all of the panoramic images with geographic locations within the map view for a constellation at once, or rather, without needing to select the individual images.

Once a user has selected to connect a set of panoramic images, the client computing device may display a connection view. This connection view may allow the user to view the panoramic images as well as the relationships between them in the constellation. The connection view may also provide markers which identify the various panoramic images so that the user can compare relationships between the panoramic images in various configurations. As an example, the connection view may include a map, such as an overhead map, that identifies the relative geographic locations of panoramic images using map markers. The connection view may also include a reference panoramic image display that identifies the connections between a reference panoramic image and other panoramic images using reference markers as if the user were standing on the ground plane.

The connection view may also display potential paths between panoramic images. The potential paths may be displayed between the map markers representing different panoramic images. These potential paths may represent suggested connections between the represented panoramic images that the user may select to add to the constellation of panoramic images. The potential paths may be suggested based on the relative locations and/or timestamps of the panoramic images.

The connection view may also allow the user to create and change relationships between panoramic images. In one aspect, the user may change the location of the map markers and/or the reference markers. A change to a map marker for a panoramic image may cause a similar change in a corresponding reference marker for that panoramic image. Similarly, a change to a reference marker for a panoramic image may cause a similar change in a corresponding map marker for that panoramic image. In addition, the connection view may allow the user to choose, create, or delete paths between the panoramic images. As an example, a user may select to include a suggested potential path between two panoramic images in a constellation. The user may also draw paths between map markers. In some aspects, the client computing device may make recommendations of panoramic images to add to the set of panoramic images for connection in the connection view.

The initial reference panoramic image displayed in the connection view may be selected from the set of panoramic images chosen to be connected by the user. This reference panoramic image may be changed. Once the reference panoramic image has been changed by the user, the client computing device may display new suggested potential paths. These new suggested potential paths may be identified based on the locations and/or times the panoramic images. In addition, the new reference panoramic image may also be displayed with a set of reference markers indicating the relationship between the new reference panoramic image and other panoramic images of the set of panoramic images.

Once the user has activated or drawn all of the desired connections between the panoramic images of the set of panoramic images, the result may be a constellation as described above. The user may test the navigation experience of the constellation by changing the type in the reference panoramic image display. In this way, the user is able to preview a panoramic image and navigate through the panoramic image in the way that the panoramic image would be displayed during the navigation experience. The constellation may be saved for later editing or published as navigation data for a navigation experience.

Example Systems

Figure 2:
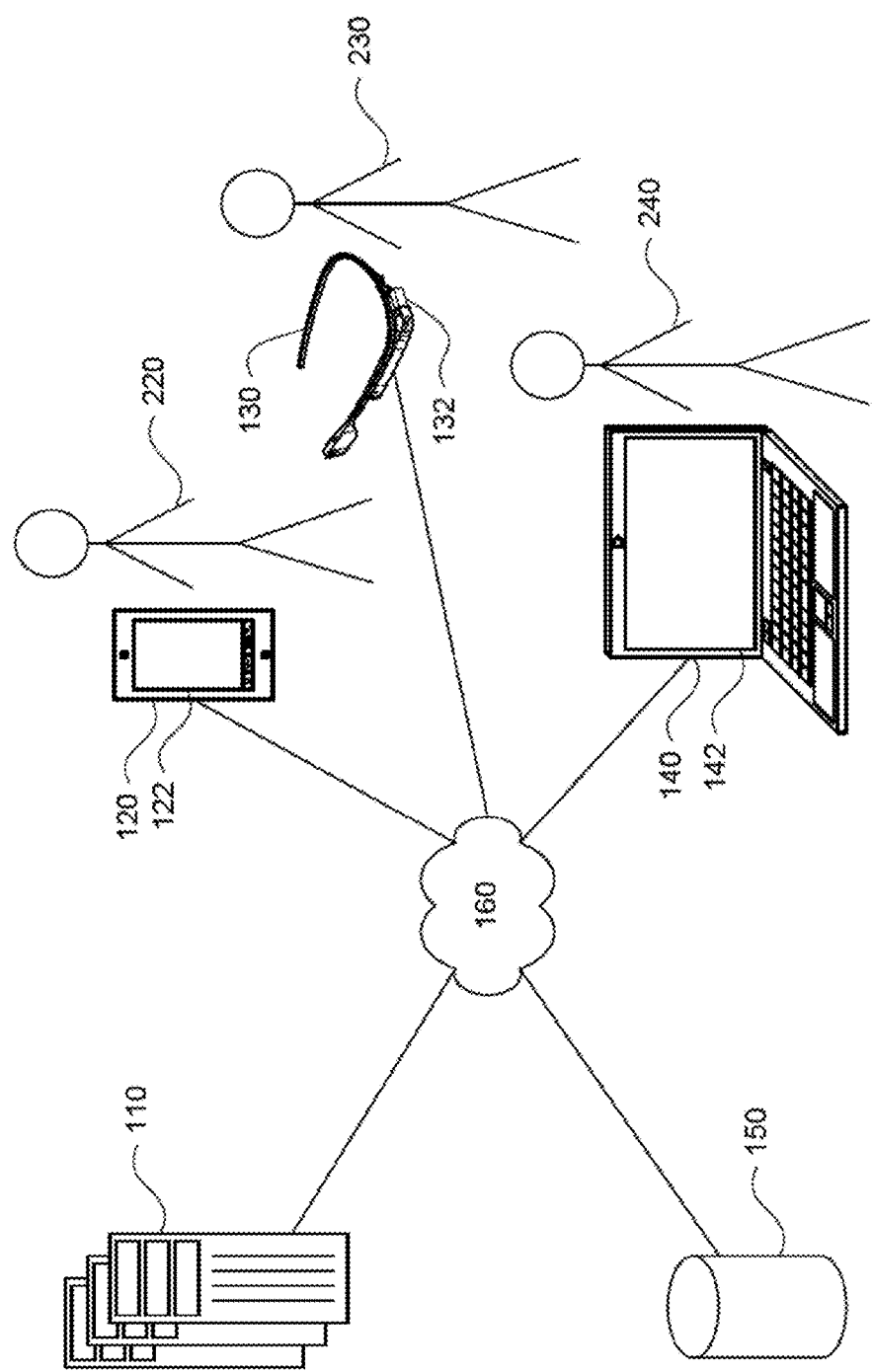
FIG. 2 is a pictorial diagram of the example system of FIG. 1.

FIGS. 1 and 2 include an example system 100 in which the features described above may be implemented. It should not be considered as limiting the scope of the disclosure or usefulness of the features described herein. In this example, system 100 can include computing devices 110, 120, 130, and 140 as well as storage system 150. Computing device 110 can contain one or more processors 112, memory 114 and other components typically present in general purpose computing devices. Memory 114 of computing device 110 can store information accessible by processor 112, including instructions 116 that can be executed by the processor 112.

Memory can also include data 118 that can be retrieved, manipulated or stored by the processor. The memory can be of any non-transitory type capable of storing information accessible by the processor, such as a hard-drive, memory card, ROM, RAM, DVD, CD-ROM, write-capable, and read-only memories.

The instructions 116 can be any set of instructions to be executed directly, such as machine code, or indirectly, such as scripts, by the processor. In that regard, the terms "instructions," "application," "steps" and "programs" can be used interchangeably herein. The instructions can be stored in object code format for direct processing by the processor, or in any other computing device language including scripts or collections of independent source code modules that are interpreted on demand or compiled in advance. Functions, methods and routines of the instructions are explained in more detail below.

Data 118 can be retrieved, stored or modified by processor 112 in accordance with the instructions 116. For instance, although the subject matter described herein is not limited by any particular data structure, the data can be stored in computer registers, in a relational database as a table having many different fields and records, or XML documents. The data can also be formatted in any computing device-readable format such as, but not limited to, binary values, ASCII or Unicode. Moreover, the data can comprise any information sufficient to identify the relevant information, such as numbers, descriptive text, proprietary codes, pointers, references to data stored in other memories such as at other network locations, or information that is used by a function to calculate the relevant data.

The one or more processors 112 can include any conventional processors, such as a commercially available CPU. Alternatively, the processor can be a dedicated component such as an ASIC or other hardware-based processor. Although not necessary, computing devices 110 may include specialized hardware components to perform specific computing processes, such as decoding video, matching video frames with images, distorting videos, encoding distorted videos, etc. faster or more efficiently.

Although FIG. 1 functionally illustrates the processor, memory, and other elements of computing device 110 as being within the same block, the processor, computer, computing device, or memory can actually comprise multiple processors, computers, computing devices, or memories that may or may not be stored within the same physical housing. For example, the memory can be a hard drive or other storage media located in a housing different from that of computing devices 110. Accordingly, references to a processor, computer, computing device, or memory will be understood to include references to a collection of processors, computers, computing devices, or memories that may or may not operate in parallel. For example, the computing devices 110 may include server computing devices operating as a load-balanced server farm. Yet further, although some functions described below are indicated as taking place on a single computing device having a single processor, various aspects of the subject matter described herein can be implemented by a plurality of computing devices, for example, communicating information over network 160.

The computing devices 110 can be at various nodes of a network 160 and capable of directly and indirectly communicating with other nodes of network 160. Although only a few computing devices are depicted in FIGS. 1-2, it should be appreciated that a typical system can include a large number of connected computing devices, with each different computing device being at a different node of the network 160. The network 160 and intervening nodes described herein can be interconnected using various protocols and systems, such that the network can be part of the Internet, World Wide Web, specific intranets, wide area networks, or local networks. The network can utilize standard communications protocols, such as Ethernet, WiFi and HTTP, protocols that are proprietary to one or more companies, and various combinations of the foregoing. Although certain advantages are obtained when information is transmitted or received as noted above, other aspects of the subject matter described herein are not limited to any particular manner of transmission of information.

As an example, computing devices 110 may include one or more web servers that are capable of communicating with storage system 150 as well as computing devices 120, 130, and 140 via the network. For example, server computing devices 110 may use network 160 to transmit and present information to a user, such as user 220, 250, or 250, on a display, such as displays 122, 132, or 142 of computing devices 120, 130, or 140. In this regard, computing devices 120, 130, and 140 may be considered client computing devices and may perform all or some of the features described below.

Each of the client computing devices may be configured similarly to the server computing devices 110, with one or more processors, memory and instructions as described above. Each client computing device 120, 130 or 140 may be a personal computing device intended for use by a user 220, 250, 250, and have all of the components normally used in connection with a personal computing device such as a central processing unit (CPU), memory (e.g., RAM and internal hard drives) storing data and instructions, a display such as displays 122, 132, or 142 (e.g., a monitor having a screen, a touch-screen, a projector, a television, or other device that is operable to display information), and user input device 125 (e.g., a mouse, keyboard, touch-screen or microphone). The client computing device may also include a camera for recording video streams, speakers, a network interface device, and all of the components used for connecting these elements to one another.

Although the client computing devices 120, 130 and 140 may each comprise a full-sized personal computing device, they may alternatively comprise mobile computing devices capable of wirelessly exchanging data with a server over a network such as the Internet. By way of example only, client computing device 120 may be a mobile phone or a device such as a wireless-enabled PDA, a tablet PC, or a netbook that is capable of obtaining information via the Internet. In another example, client computing device 130 may be a head-mounted computing system. As an example the user may input information using a small keyboard, a keypad, microphone, using visual signals with a camera, or a touch screen.

Storage system 150 may store user account information. The user account information may include login information such as a username or email and password combination as well as other information provided by a user. As an example, this information may include various images uploaded by a user, such as those described above as having a field of view which is greater than that of the human eye, e.g., 180 degrees or greater. The example panoramas described herein provide a 360-degree view of a location, though other types of images may also be used. In addition, each panoramic image may be associated with geographic location information indicating the location, and in some cases the orientation, at which the panoramic image was captured as well as timestamp information indicating the date and time at which the panoramic image was captured.

Storage system 150 may also store navigation data for generating navigation experiences. In some examples, this navigation data may be generated by individual users and uploaded to the storage system as described below.

As with memory 114, storage system 150 can be of any type of computerized storage capable of storing information accessible by server 110, such as a hard-drive, memory card, ROM, RAM, DVD, CD-ROM, write-capable, and read-only memories. In addition, storage system 150 may include a distributed storage system where data is stored on a plurality of different storage devices which may be physically located at the same or different geographic locations. Storage system 150 may be connected to the computing devices via the network 160 as shown in FIG. 1 and/or may be directly connected to any of the computing devices 110-140 (not shown).

Example Methods

In order to connect panoramic images and create a constellation, the user may first access his or her panoramic images. As an example, user 240 of client computing device 140 may access panoramic images stored locally at client computing device 140. Alternatively, the user 240 may access his or her panoramic images stored remotely, such as at storage system 150, by logging into an account managed by one or more of server computing devices 110. In this regard, client computing device 140 and the server computing devices may send and receive login information (such as a user name and password) as well as the user's panoramic images.

Once the client computing device has accessed the user's panoramic images, the user may select to connect panoramic images in a constellation. In addition, the client computing device may indicate, or recommend, or suggest which panoramic images should and should not (or cannot) be connected together in a constellation. Similarly, the client computing device may indicate or suggest sets of panoramic images that may be connected to generate a constellation. As an example, these indications may be based on when and where the panoramic images were captured.

Figure 3:
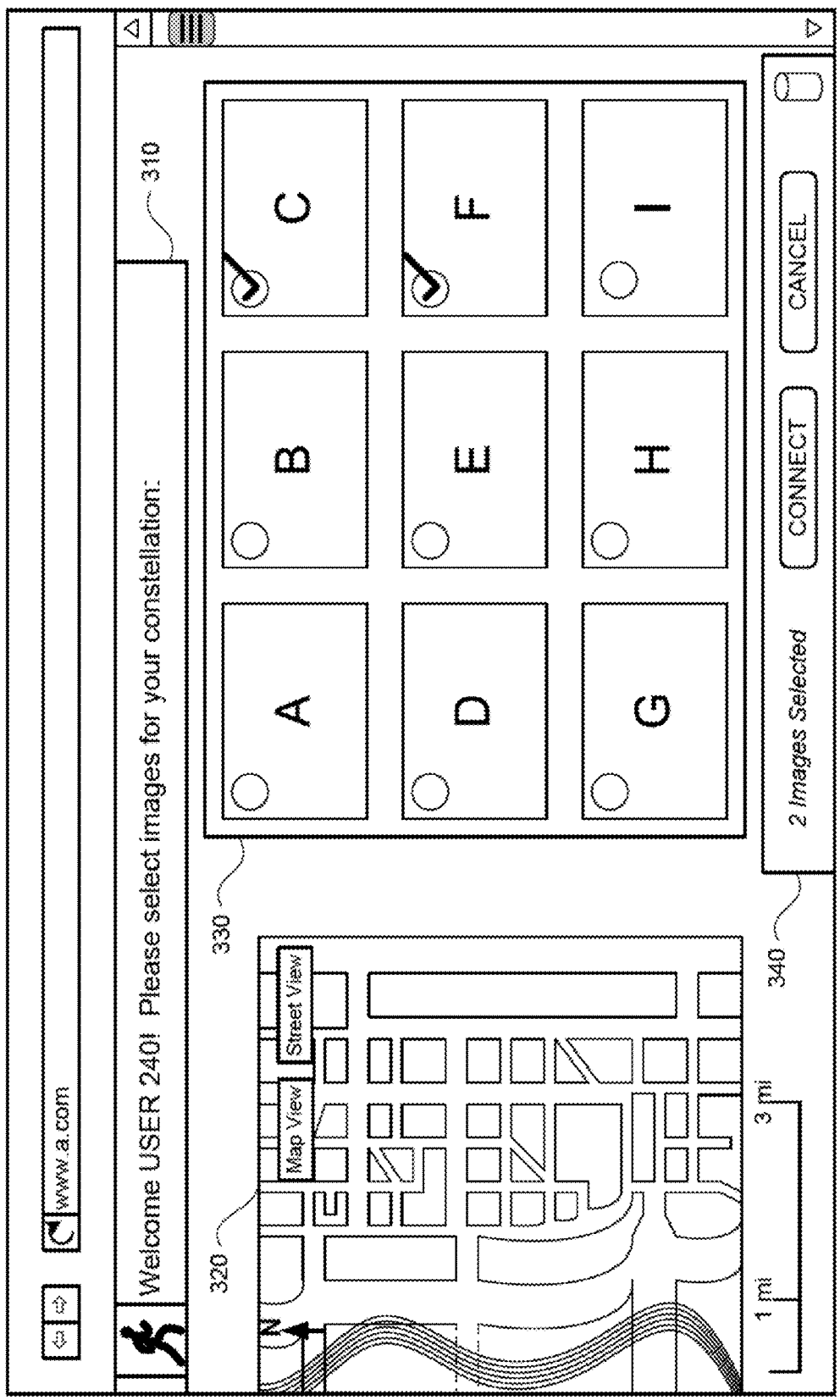
FIG. 3 is an example screen shot in accordance with aspects of the disclosure.

FIG. 3 is an example screen shot 300 of display 142. Screen shot 300 includes various panes. In this example, pane 310 identifies user 240, pane 320 includes a map, pane 330 includes a plurality of panoramic images A-I, and pane 340 includes various information and user options. The user may select panoramic images for a constellation by clicking on the panoramic images. In this example, panoramic images C and F have been selected and appear with check marks. In addition, pane 340 indicates that two images have been selected. Similarly, panoramic images A, B, D, E, and G-I have not been selected and do not appear with check marks.

Once the user has selected one or more images for a constellation, the client computing device may automatically make other panoramic images available or unavailable for inclusion in a constellation. In one example, shown in screen shot 400 of FIG. 4, because the user has selected panoramic images C and F for a constellation, client computing device 140 automatically grayed out panoramic images D and E to indicate that these images cannot be included in a constellation with panoramic images C and F. As noted above, this may be because panoramic images C and F were captured at locations which were more than some maximum threshold distance, such as 1 mile or more, from images C and F. This maximum distance threshold may also be determined based on the type of the panoramic images or location at which the panoramic images were captured. For example, while a 1 mile distance may be appropriate for images of a beach or hiking trail, it may not be appropriate for a navigation experience within an office building or around a shopping mall, which may employ a much smaller maximum distance threshold.

Alternatively, panoramic images C and F may appear as unavailable based on when these images were captured. For example, using the timestamp information, if panoramic images D and E were captured during daylight hours and panoramic images C and F were not, panoramic images C and F may be made unavailable. Similarly, if panoramic images D and E were captured during a particular season of year (fall or winter), and panoramic images C and F were captured during another time of year (spring or summer), again, panoramic images C and F may be made unavailable.

Figure 4:
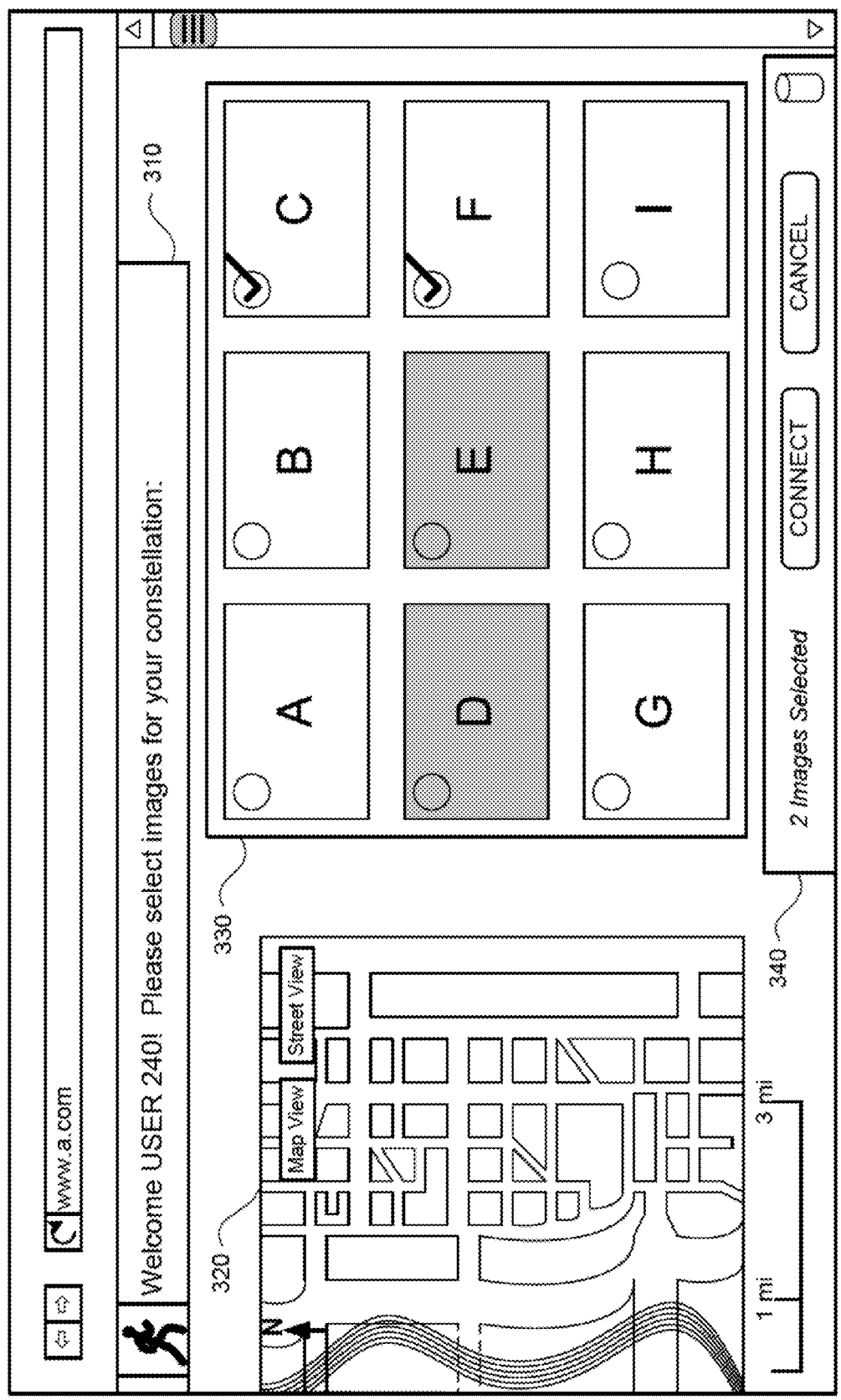
FIG. 4 is another example screen shot in accordance with aspects of the disclosure.

When the user has completed his or her selection of panoramic images for a constellation, the user may select to connect these images. For example, as shown in FIGS. 3 and 4, the user may select the connect option of pane 340. This option, as well as those discussed below, may be selected, for example, by using a mouse pointer, touch screen, stylus, etc. Alternatively, the user may select the cancel option of pane 340 to reset all of the images to an unselected mode.

In some examples, a user may have a panoramic image which has not been made unavailable based on time or location, but may still be unavailable for some other reason. For example, in order to generate a constellation, the user may be required to approve individual panoramic images for use in a constellation or make those panoramic images publically available. Thus, images which the user has not made publically available may be shown as grayed out, as in the example of screen shot 400. Alternatively, these panoramic images may be shown as available until the user selects a panoramic image that is otherwise unavailable or unapproved to be included in a constellation.

Figure 5:
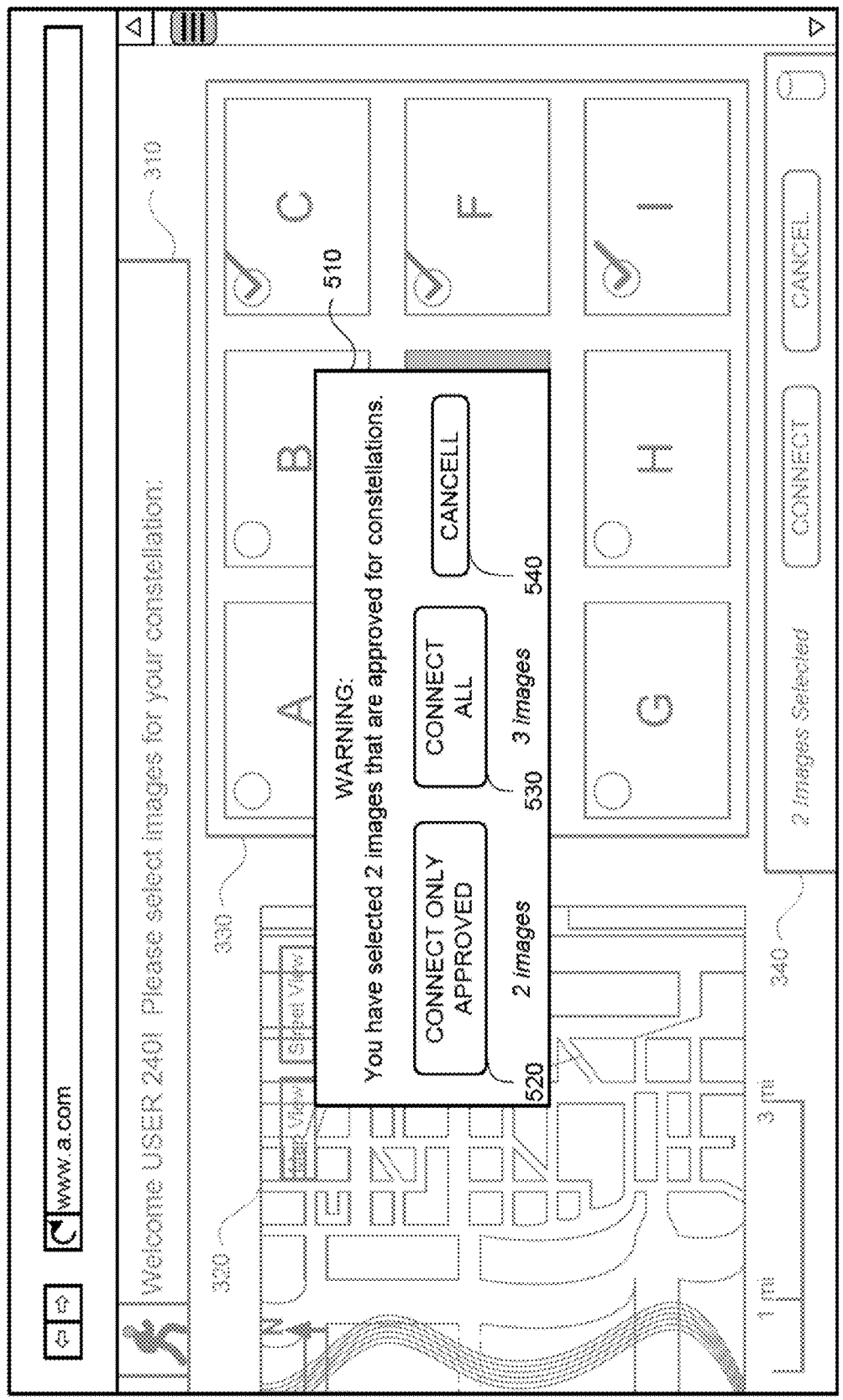
FIG. 5 is a further example screen shot in accordance with aspects of the disclosure.

As shown in FIG. 5, when the user has selected an image which was not approved for use with constellations (or as part of a navigation experience), or attempted to connect one or more images that were not approved for constellations, client computing device 140 may display a warning message. Warning message 510 indicates that this panoramic image, here panoramic image I, cannot be included in a constellation. In this example, the user has several options 520, 530, and 540. These options may allow the user to continue to connect only the approved panoramic images, connect all of the panoramic images anyway, or cancel the selection of the particular unapproved panoramic image.

Rather than selecting individual images to create a constellation, client computing device may automatically recommend sets of panoramic images to be used in a constellation. As noted above, panoramic images may be pre-grouped in sets for connections based on the locations where the panoramic images were captured as well as the time of capture. For example, the client computing device 140 (or one or more of server computing devices 110) may identify sets of the user's panoramic images that were captured at or near the same location. In order to do so, the computing device may identify sets of panoramic images that are within a predetermined maximum distance threshold of one another. As in the example above, the maximum distance threshold may also be determined based on the type of the panoramic images or location at which the panoramic images were captured. As a further example, in order to be recommended to a user, a set of panoramic images may be required to have a minimum number of images, for example, 3 or more in order to create a more interesting navigation experience.

Panoramic images may also be grouped together in sets based on the time of capture. As discussed in the example above, panoramic images may be grouped together if they were captured during the same or similar time of day, season, day or year, etc.

Figure 6:
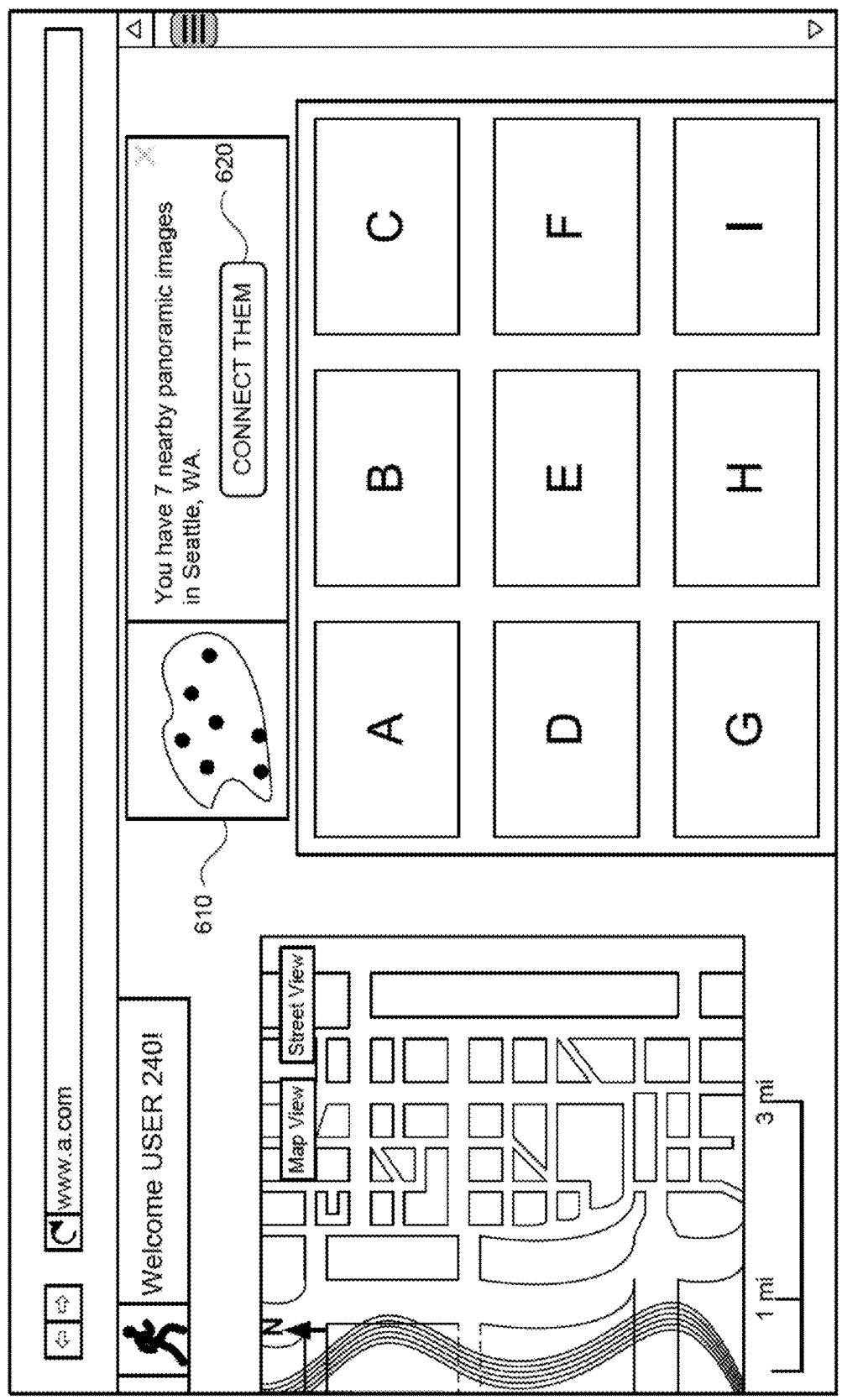
FIG. 6 is an example screen shot in accordance with aspects of the disclosure.

The example of screen shot 600 of FIG. 6 includes a recommendation pane 610. In this example, recommendation pane 610 indicates that there are 7 panoramic images nearby one another that can be connected in a constellation. These 7 panoramic images may be grouped together by the client computing device 140 (or one or more of server computing devices 110) based on the location, here Seattle, Wash., and/or time of capture as described above. Pane 610 also provides the user with an option 620 to automatically connect them.

Figure 7:
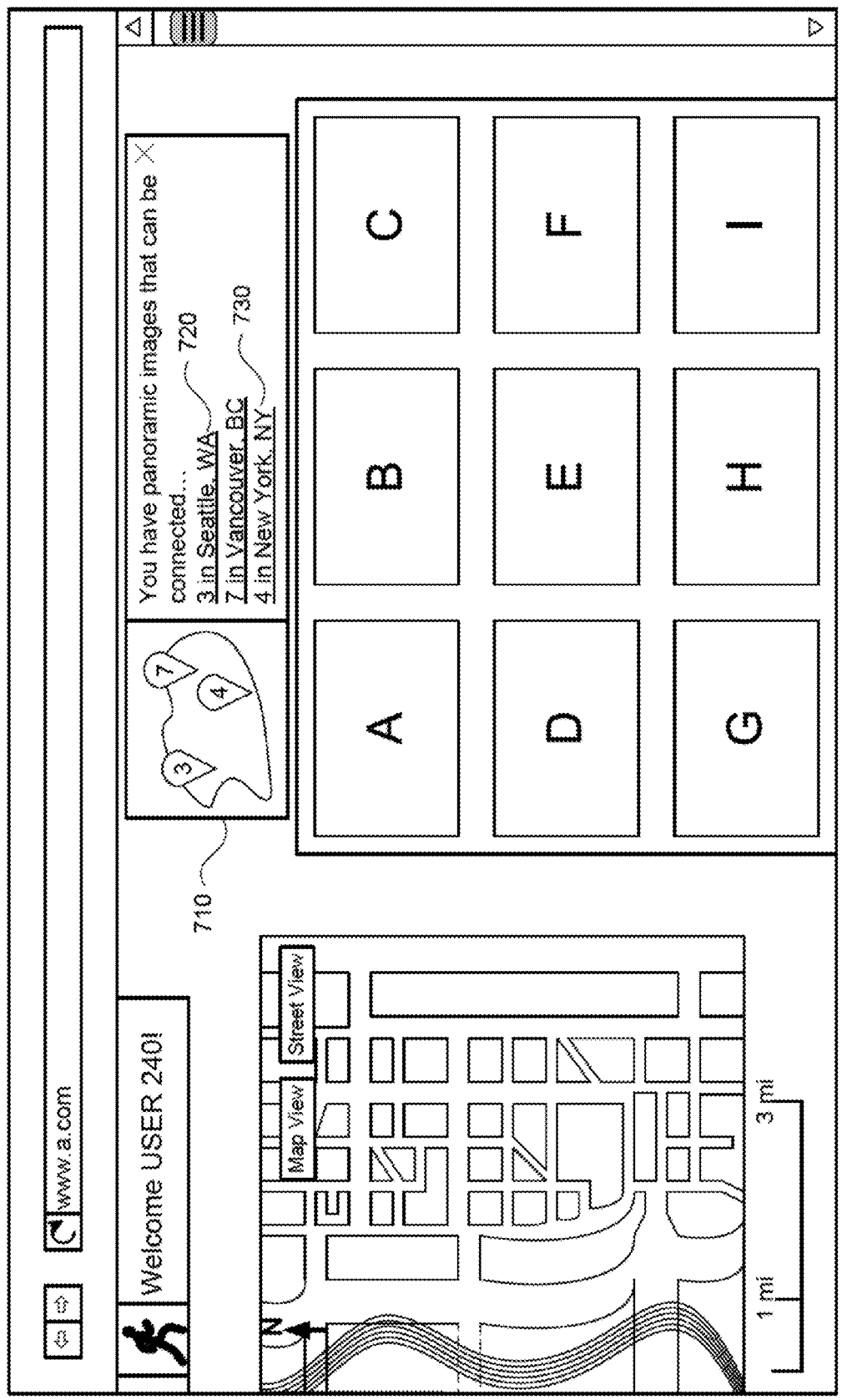
FIG. 7 is another example screen shot in accordance with aspects of the disclosure.

The example of screen shot 700 of FIG. 7 includes a recommendation pane 710. In this example, recommendation pane 710 indicates that there are panoramic images that can be connected in various locations. For example, recommendation pane 710 suggests that there are 3 panoramic images taken at or near Seattle, Wash., 7 panoramic images take at or near Vancouver, BC, and 4 panoramic images taken at or near New York, N.Y. that may be selected for connections in constellations. In this example, the panoramic images may be selected for automatic connection by selecting or clicking on hyperlink 720 for the Seattle, Wash. example or hyperlink 730 for the New York, N.Y. example. Again, these sets of panoramic images may also be determined by client computing device 140 based on the locations and/or times of capture as described above.

Figure 8:
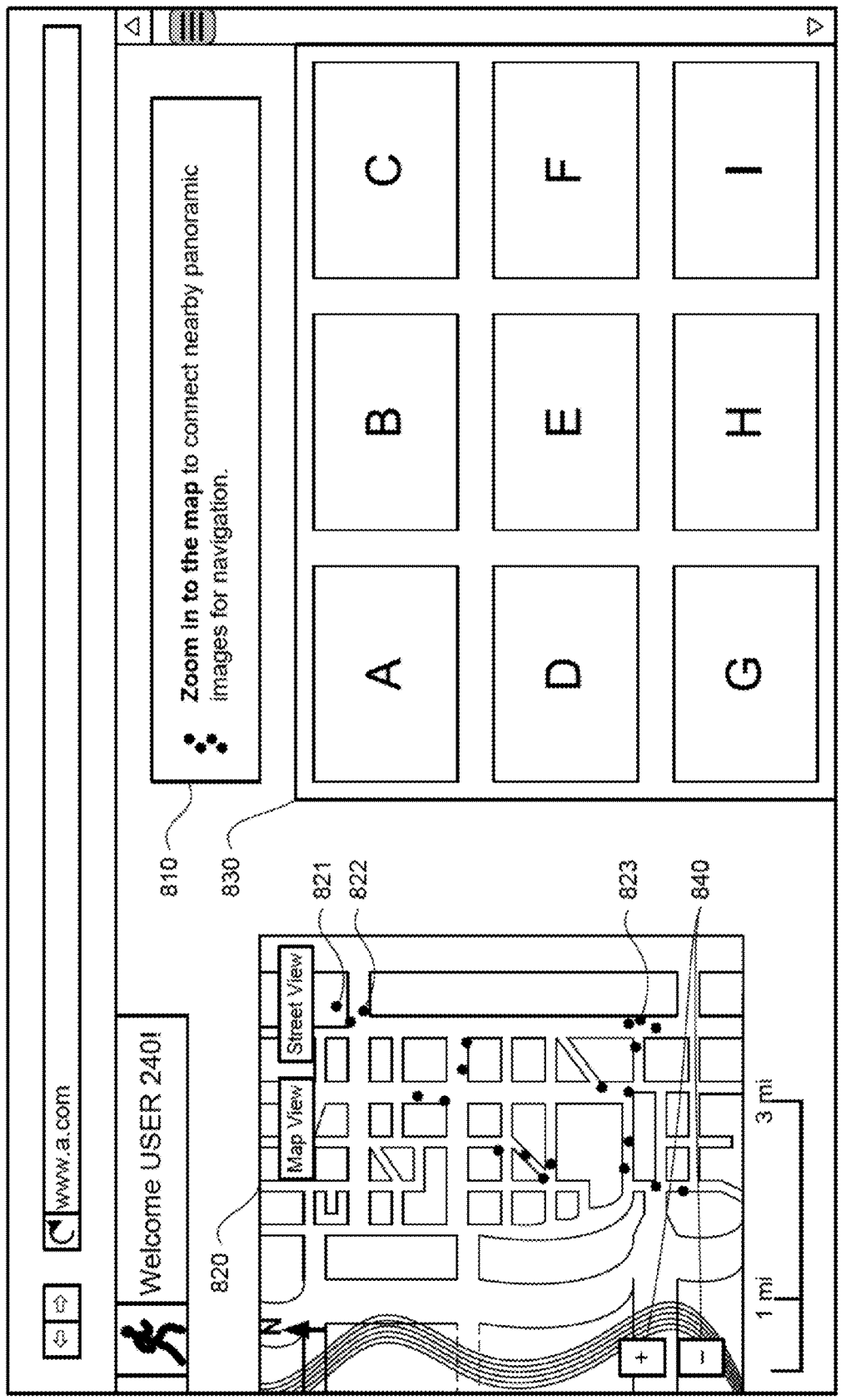
FIG. 8 is a further example screen shot in accordance with aspects of the disclosure.

In another example, the user may select panoramic images for connection based a map view of the user's panoramic images. Once the user has zoomed into a predefined zoom level of the map, the user may be able to connect images with location of capture within the displayed area of the map for a constellation. For example, screen shot 800 of FIG. 8 includes a pane 810 which indicates to the user that if he or she zooms into the map 820, he or she will be able to connect nearby panoramic images for a constellation. In this example, map 820 may include various marker points 821-825 which may refer to the geographic locations of one or more of the panoramic images A-I of pane 830. The user may zoom in on the map by selecting or clicking on a portion of the map or by selecting or clicking on zoom controls 840. The user may also reorient the map by sliding map 820 in various directions.

Figure 9:
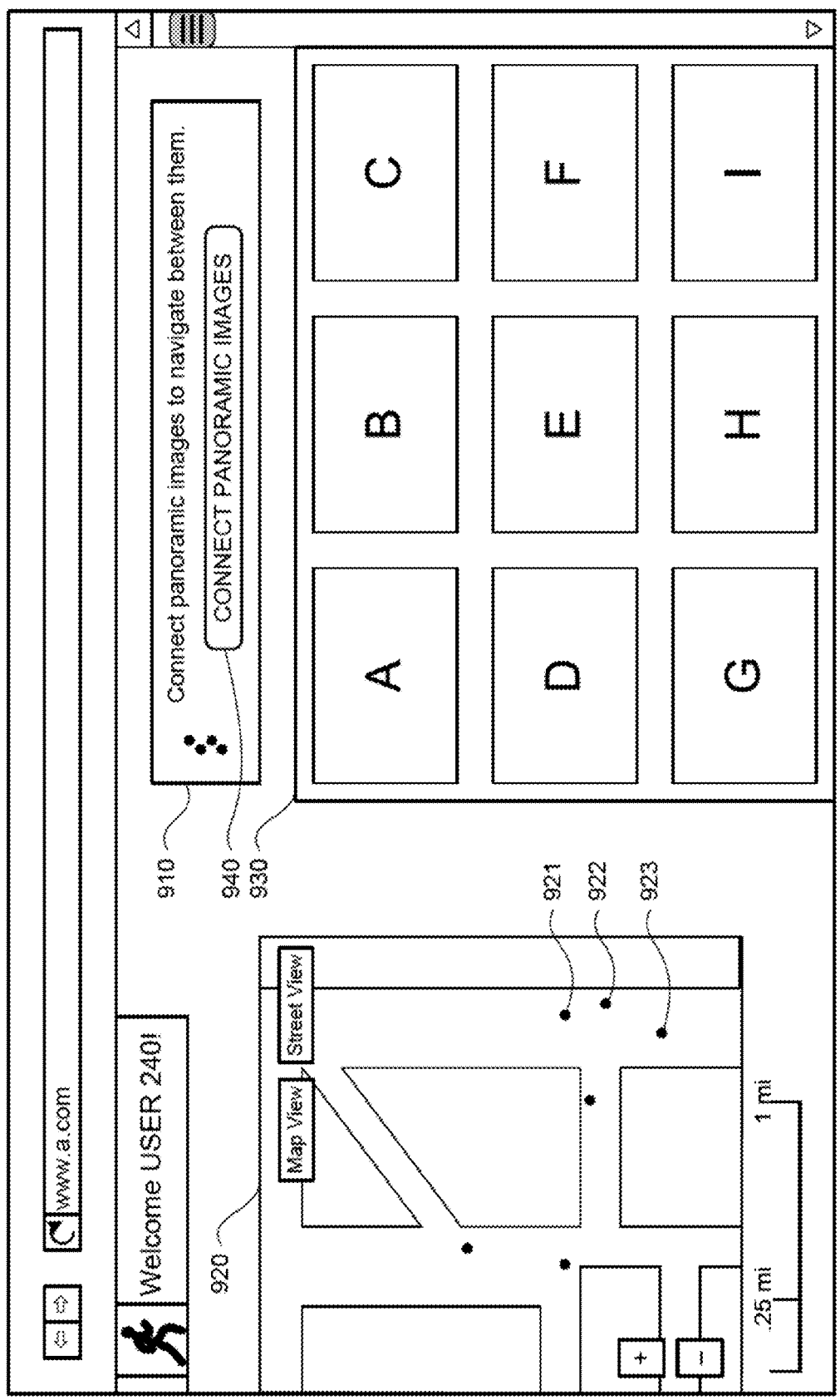
FIG. 9 is an example screen shot in accordance with aspects of the disclosure.

As shown in screen shot 900 of FIG. 9, the user has zoomed into the map 920 to a predetermined zoom level. At this zoom level, map 910 may include various marker points 921-923 which may refer to the geographic locations of one or more of the panoramic images A-I of pane 930, as well as one or more of various marker points of map 820 of FIG. 8. In the example of FIG. 9, pane 910 indicates to the user that he or she is now able to connect panoramic images for a constellation. Pane 910 also includes an option 940 to connect the panoramic images displayed in the map 920. Thus, the user may automatically connect the panoramic images represented by the various marker points of map 920.

Once a user has selected to connect a set of panoramic images, the client computing device may display a connection view. This connection view may allow the user to view the panoramic images as well as the relationships between and among them in the constellation. This connection view may display recommended, selected, or user-added paths between the panoramic images. The user may use the connection view to create and change relationships as well as add or remove paths. In some aspects, the connection view may provide markers which identify the various panoramic images so that the user can compare relationships between the panoramic images in various views. As an example, the connection view may include a map that identifies the relative geographic locations of panoramic images using map markers as well as a reference panoramic image display that identifies the connections between a reference panoramic image and other panoramic images using reference markers. Although the reference and map markers used herein include alphanumeric tags, other types of markers or identifiers may also be used to provide users with a simple way to identify panoramic images and the relationship between them.

Figure 10A:
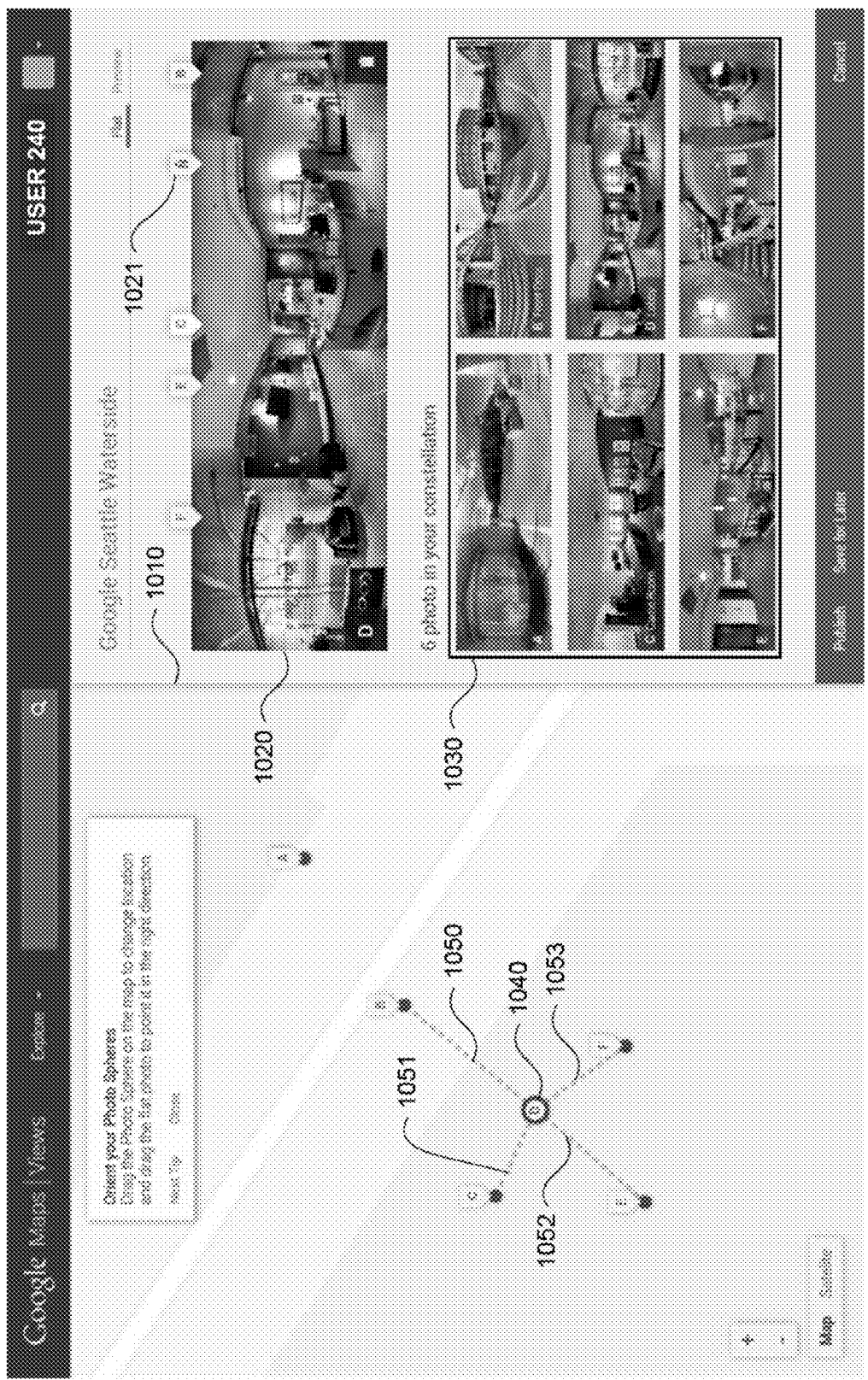
FIG. 10A is another example screen shot in accordance with aspects of the disclosure.

Screen shot 1000 of FIG. 10A is one example of a connection view configuration. This example includes a map 1010, a reference panoramic image display 1020, and the set of panoramic images 1030 to be connected in the constellation. The reference panoramic image display 1020 includes a wide-angle view, here including all of the panoramic image D. In addition, representative panoramic image display 1020 includes a direction marker 1021 indicating the orientation of the panoramic image D as well as plurality of reference markers B, C, E, and F. These reference markers may indicate actual or potential relationships between panoramic image D and each of panoramic images B, C, E, and F of the set of panoramic images 1030 as will be described in more detail below.

Map 1010 may include a map reference marker 1040 which indicates the geographic location of panoramic image D. In addition, map 1010 includes plurality of map markers A, B, C, E, and F, which represent the map locations of each of panoramic images A, B, C, E, and F of the set of panoramic images 1030. In this example, the reference map marker 1040 is shown differently from the map markers A, B, C, E and F to indicate that panoramic image D is currently set as a reference panoramic image.

As noted above, the connection view may also display potential paths between panoramic images. These potential paths may represent suggested connections between the panoramic images that the user may select to add to the constellation of panoramic images. In other words, these paths may represent how the user would move through the constellation of panoramic images during a navigation experience.

For example, map 1010 also includes a plurality of suggested potential paths 1050-1053. These suggested potential paths are shown in dashed line as they have not yet been selected for inclusion in the constellation by the user. In this example, potential path 1050 connects panoramic image D, the reference panoramic image, to panoramic image B. In addition, reference marker B of reference panoramic image display 1020 represents the physical relationship between panoramic images D and B, if they were connected along suggested potential path 1050. In this regard, the connection view may provide the user with two different types of representations of these relationships: both an aerial or birds-eye view of the relationship in map 1010 as well as a first person view of the relationship in reference panoramic image display 1020.

The potential paths may be suggested based on the relative locations of the panoramic images. For example, if first and second panoramic images are angularly close to one another relative to the reference panoramic image, but the second image is farther from the reference panoramic image than the first panoramic image, the client computing device may display only suggest a potential path between the reference panoramic image and the first panoramic image. This is because the navigation experience may feel more natural if the user "moves" from the reference panoramic image to the first image, and then subsequently moves to the second panoramic image.

As an example, if to panoramic images were captured at locations that are within some threshold angle, for example degrees, relative to the reference panoramic image, the client computing device may suggest only one potential path between the reference image and the panoramic image closes to the reference image. This threshold angle may be larger or smaller depending on the number of potential panoramic images and/or the locations of the panoramic images.

Figure 10B:
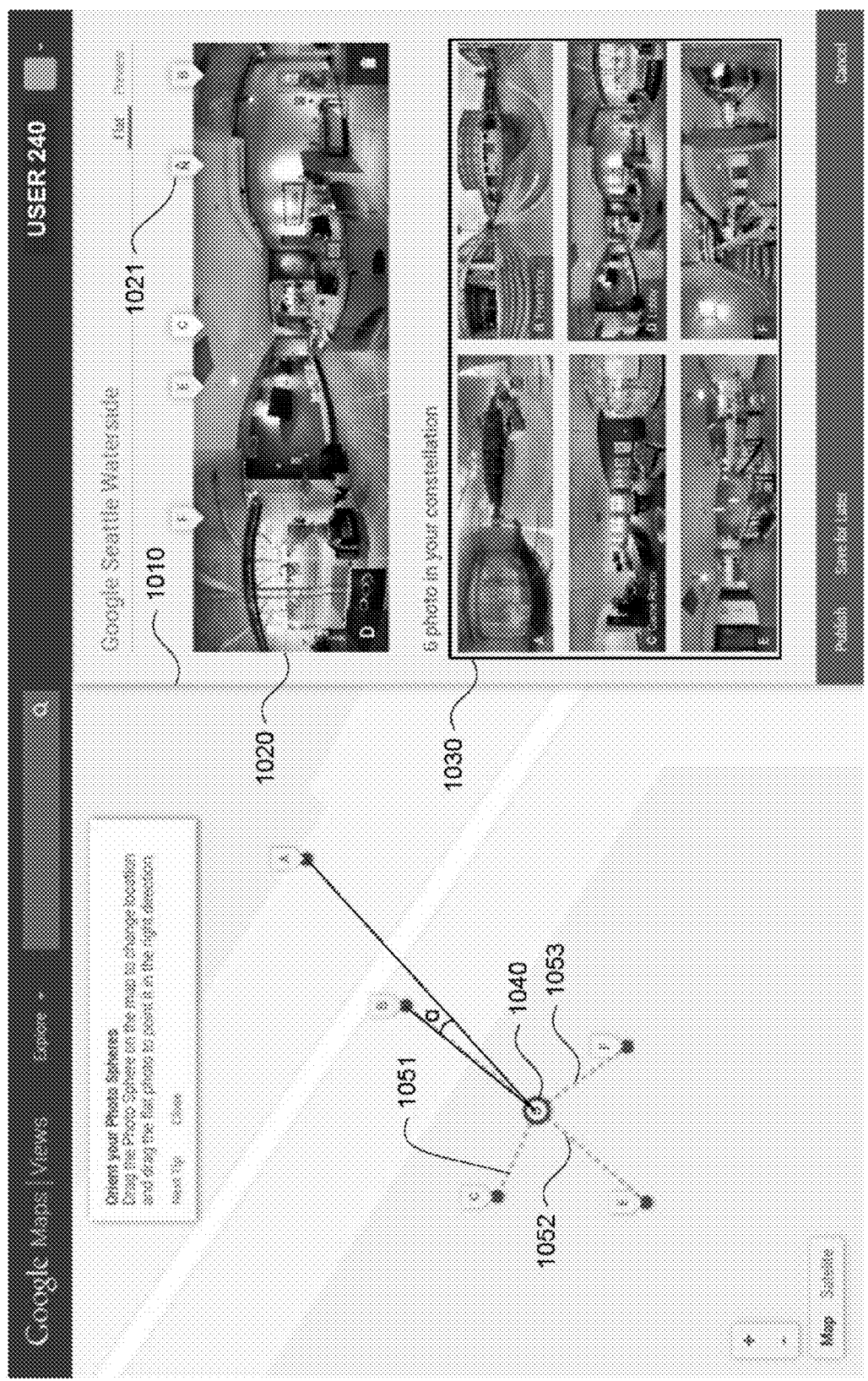
FIG. 10B is an example of the screen shot of FIG. 10A with additional data in accordance with aspects of the disclosure.

As can be seen from the example of FIG. 10B, map markers A and B are within an angle of a degrees of one another relative to reference marker 1040. In this example, a may be less than 5 degrees. In addition, map marker B is closer to the reference map marker 1040 than map marker A. Thus, map 1010 does not include a potential path between map marker A and the reference map marker 1040, but does include a suggested potential path 1050 between map marker B and the reference map marker 1040. In addition, as there is no suggested potential path between map marker A and the reference map marker 1040, reference panoramic image 1020 does not include a correspondence reference marker representing panoramic image A. In other words, there is no reference marker A in this example.

In another example, as noted above, paths between panoramic images may also be suggested based on the order in which the panoramic images were captured, or rather, the timestamp order of the panoramic images. In this regard, the suggestion potential paths between may actually follow the path that a user took when capturing the panoramic images.

The combination of the reference map marker, the potential paths, and the map markers gives the example the appearance of a hub with spokes, allowing the user to visualize the potential relationships between the panoramic images of the set of panoramic images represented by the map markers. However, a connection view's map, reference markers, and suggested potential will depend upon the set of panoramic images selected to be connected and how the panoramic images are related.

As also noted above, the connection view may allow the user to create and change relationships between panoramic images. In one aspect, the user may change the location of the map markers, there by changing the relationship between the reference panoramic image and the set of panoramic images. For example, the user may drag the reference map marker to change its location relative to the other map markers. As an example, a mouse pointer, a stylus, or a user's finger and a touch screen may be used select and drag a map marker. This, in turn, may change the relationship of the panoramic images represented by the map markers.

Figure 11:
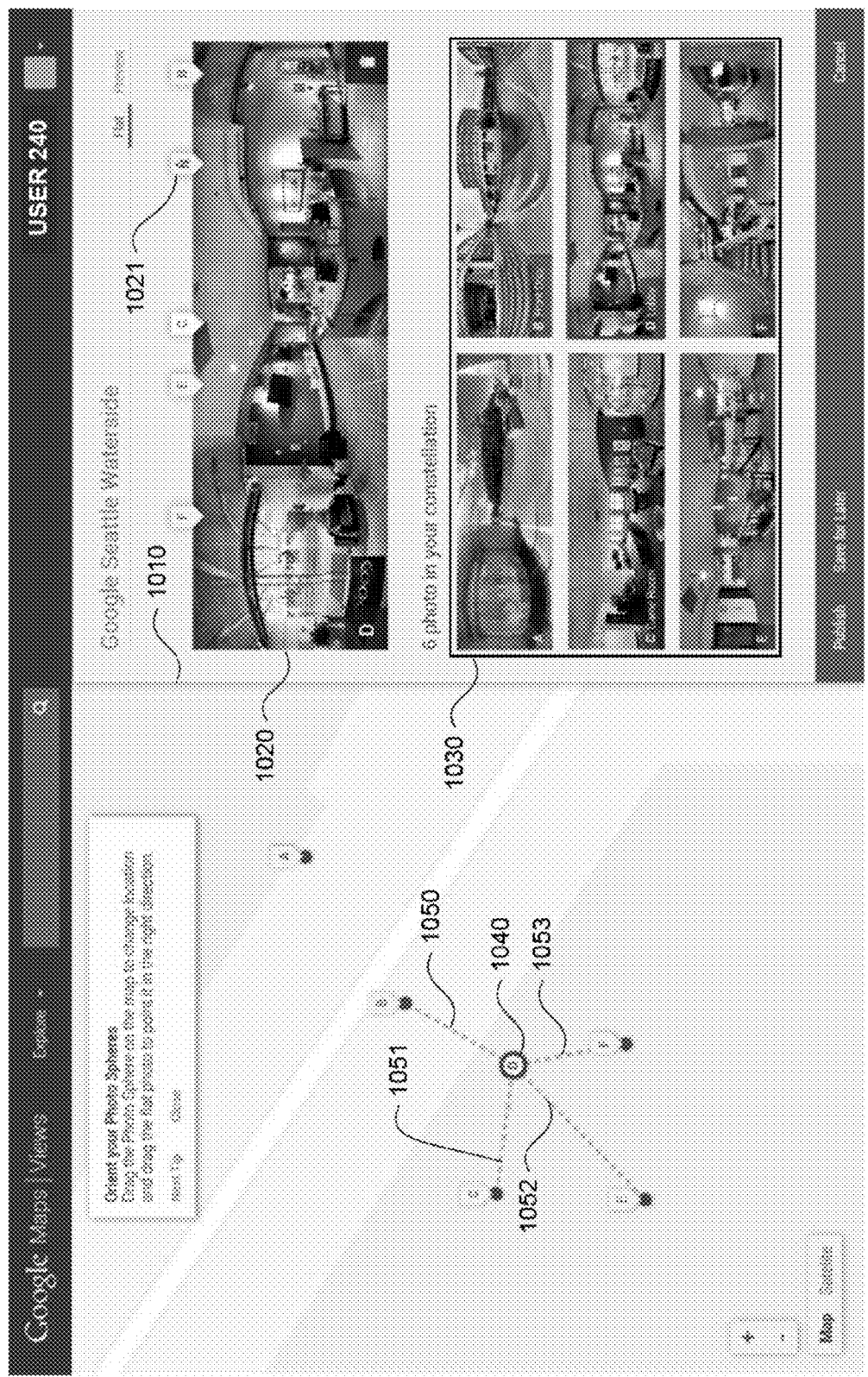
FIG. 11 is a further example screen shot in accordance with aspects of the disclosure.

In one example, the user may select and drag the reference map marker 1040 of FIG. 10A to a new location as shown in the screen shot 1100 of FIG. 11. By doing so, as can be seen between FIGS. 10 and 11, while the locations of map markers A, B, C, E, and F do not change, the locations of paths 1050-1053 are repositioned to connect reference marker 1040 with each of map markers B, C, E, and F, respectively.

Figure 12:
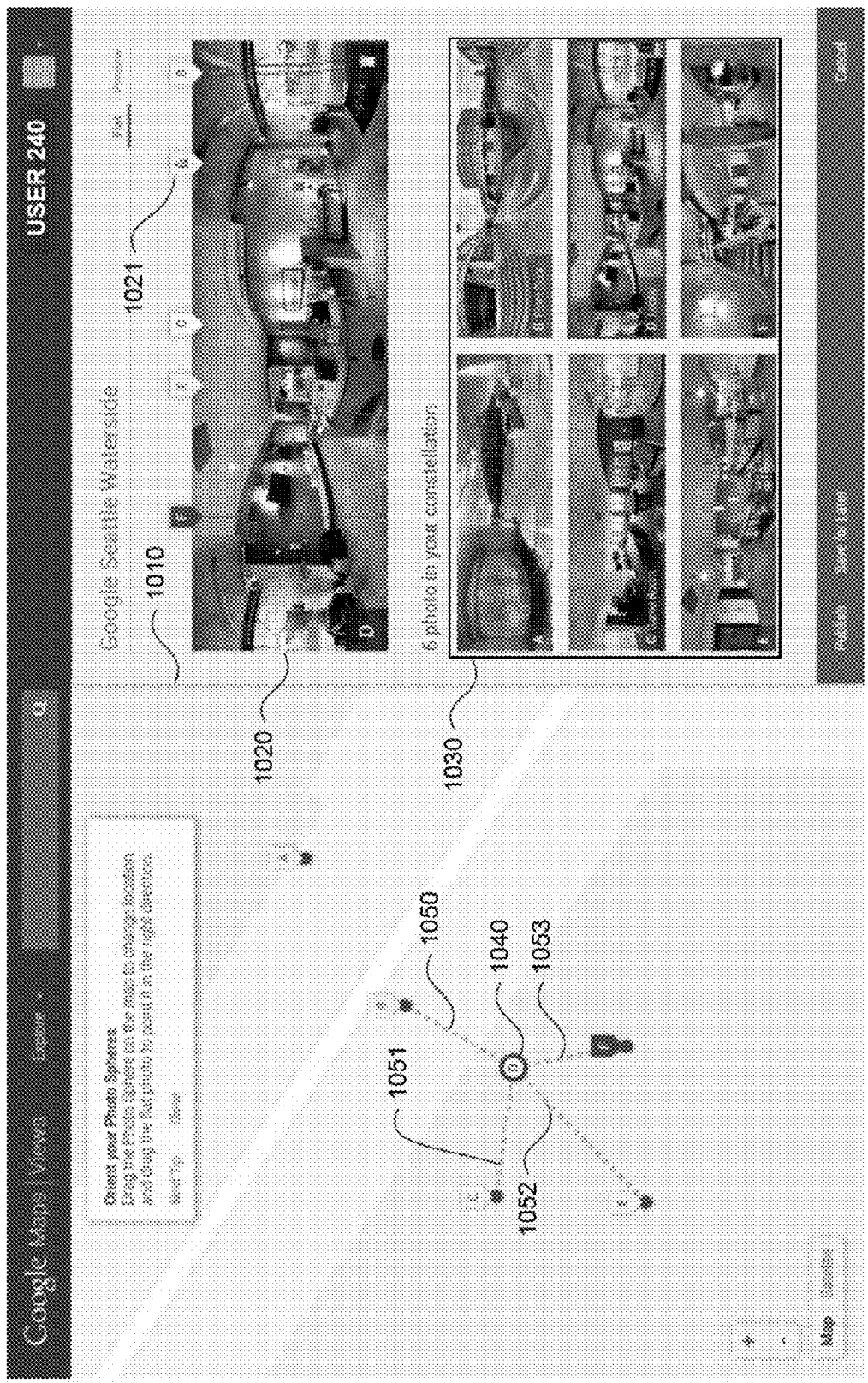
FIG. 12 is an example screen shot in accordance with aspects of the disclosure.
Figure 13:
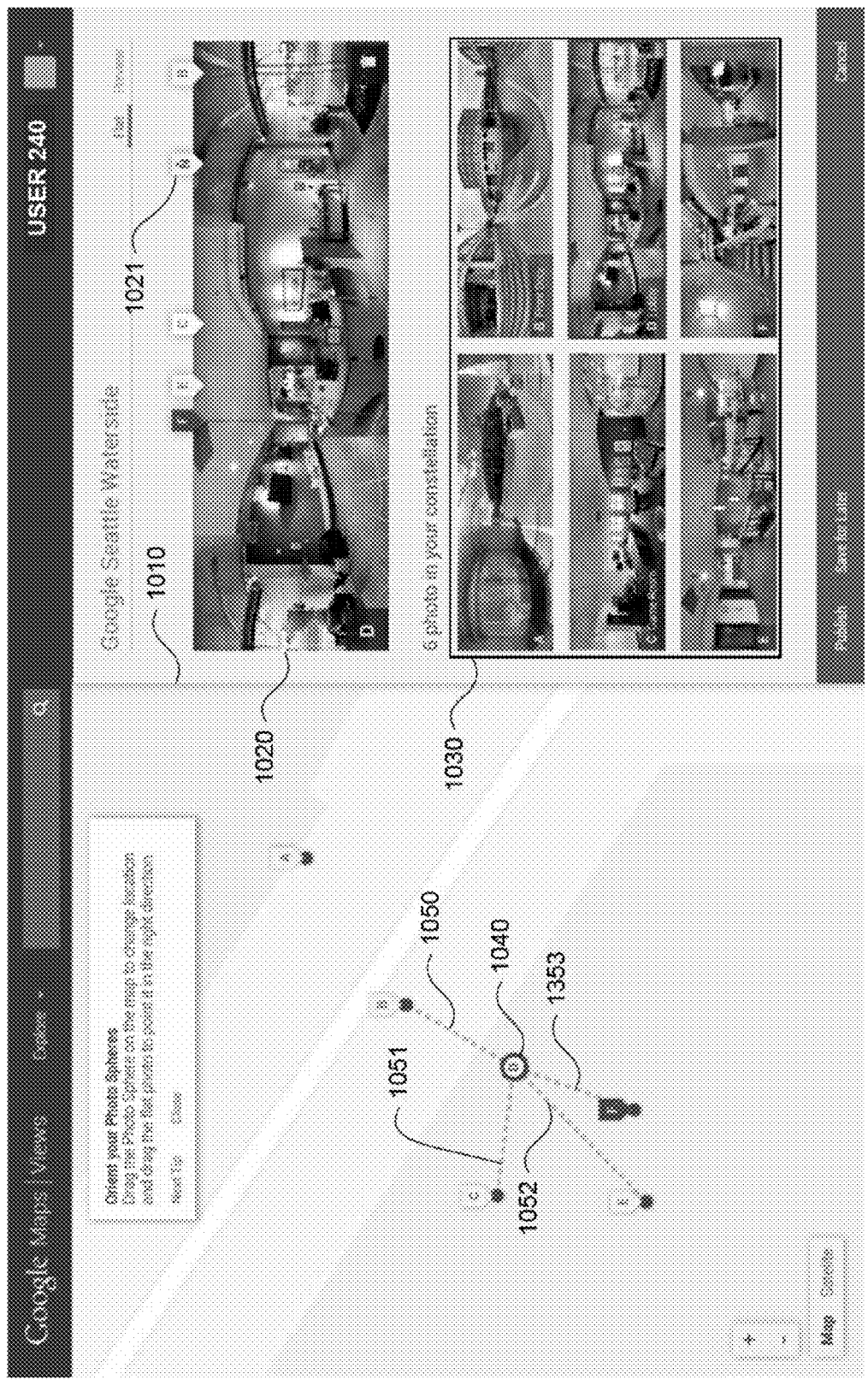
FIG. 13 is another example screen shot in accordance with aspects of the disclosure.
Figure 14:
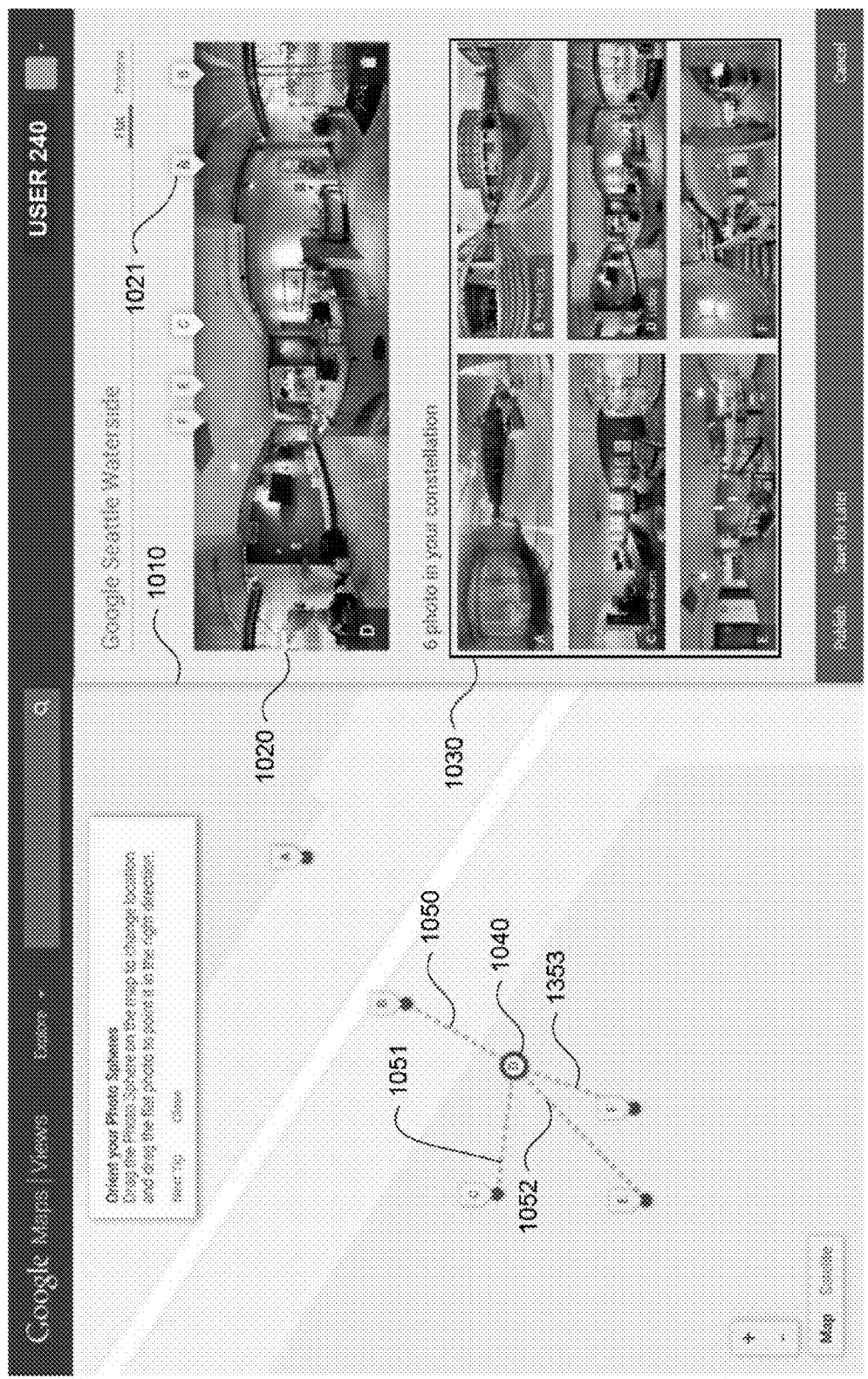
FIG. 14 is a further example screen shot in accordance with aspects of the disclosure.

In addition to moving the reference map marker, the other map markers may also be repositioned. For example, as shown in FIG. 12, the user may "grab" and "drag" map marker F to a new location as shown in example screen shot 1300 of FIG. 13. When the map marker F is grabbed in FIG. 12, it appears highlighted as well as the corresponding reference marker F of the reference panoramic image display 1020. As the user moves the map marker F to a new location relative to the map 1010, the reference marker F also moves relative to the reference panoramic image display 1020. For example, as the map marker F of FIG. 12 is moved around the reference map marker 1040 in a clock-wise direction to a new location in FIG. 13, the reference marker F of FIG. 12 is moved to the right relative to the reference panoramic image 1020 of FIG. 13. In addition, the suggested potential path 1053 is also relocated to suggested potential path 1353 so that it continues to connect the reference map marker 1040 with the map marker F. In this regard, the relationship between the panoramic image and the reference panoramic image, here between panoramic images F and D, changes as the locations of the moved map marker and corresponding reference marker change. Once the user has released the marker in its new (or previous) position, as shown in the example screen shot of 1400 of FIG. 14, the reference marker and map markers may no longer appear highlighted.

In addition, the user may also change the relationship between panoramic images using the reference markers of the representative panoramic image. For example, returning to FIG. 12 if the user selects to move the reference marker F relative to the reference panoramic image display 1020, the relative distance between reference marker 1040 and map marker F shown on map 1010 may remain fixed. Thus, when the user moves the reference marker F, the map marker F may appear to move around reference marker 1040 in a circle motion.

Figure 15:
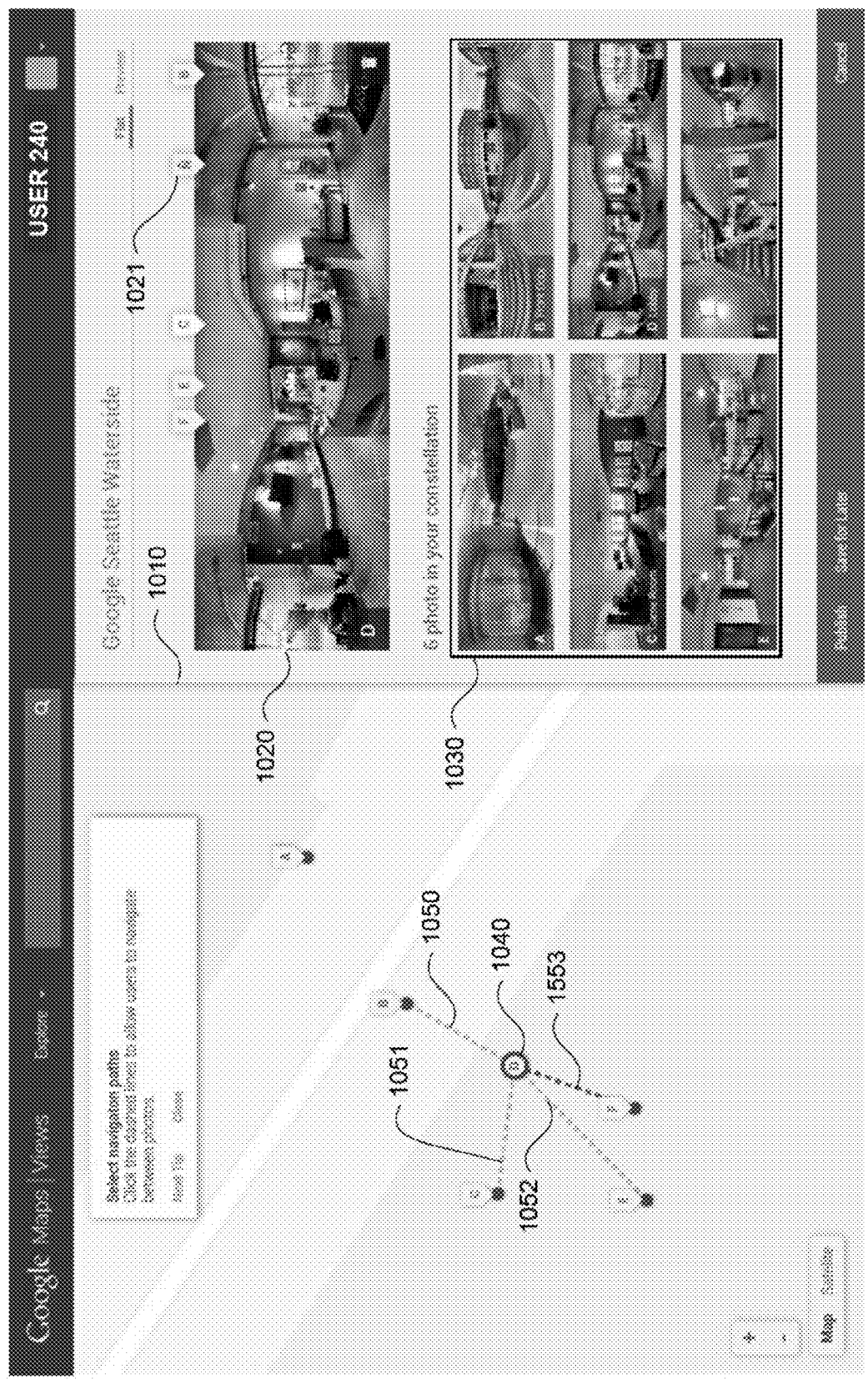
FIG. 15 is an example screen shot in accordance with aspects of the disclosure.

The connection view may allow the user to choose or create paths between the panoramic images. As an example, a user may select to include a suggested potential path between two panoramic images in a constellation. In one aspect, user may first hover over one of the suggested potential paths and by doing so, cause it to be highlighted. Accordingly, when the user hovers over the suggested potential path 1053 between map marker F and the reference map marker 1040 in FIG. 14, as shown in example screen shot 1500 of FIG. 15, the suggested potential 1353 may now be shown as a highlighted path 1553. This hovering may be accomplished by using a mouse pointer, stylus, or a user's finger and a touch screen.

Figure 16:
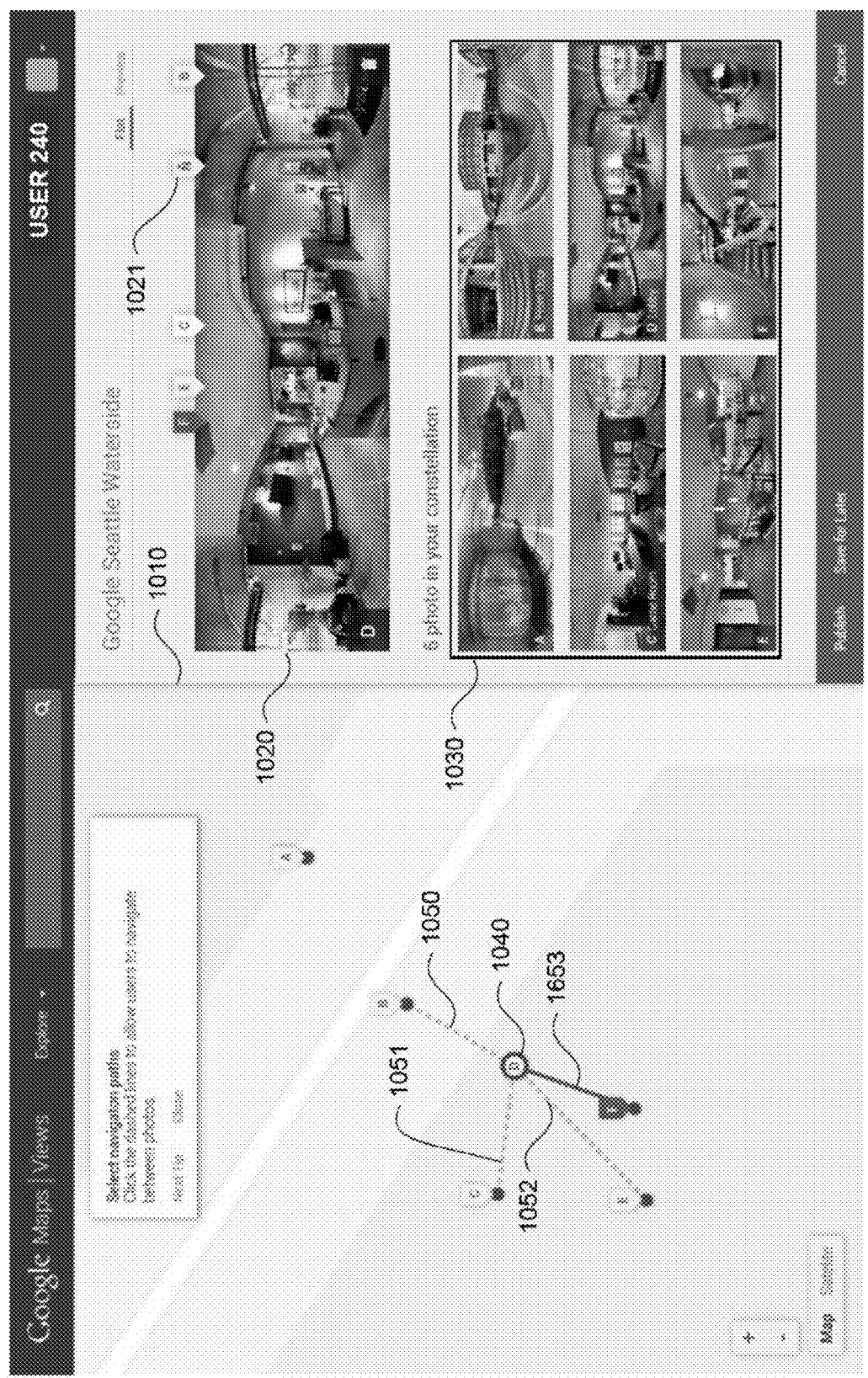
FIG. 16 is another example screen shot in accordance with aspects of the disclosure.
Figure 17:
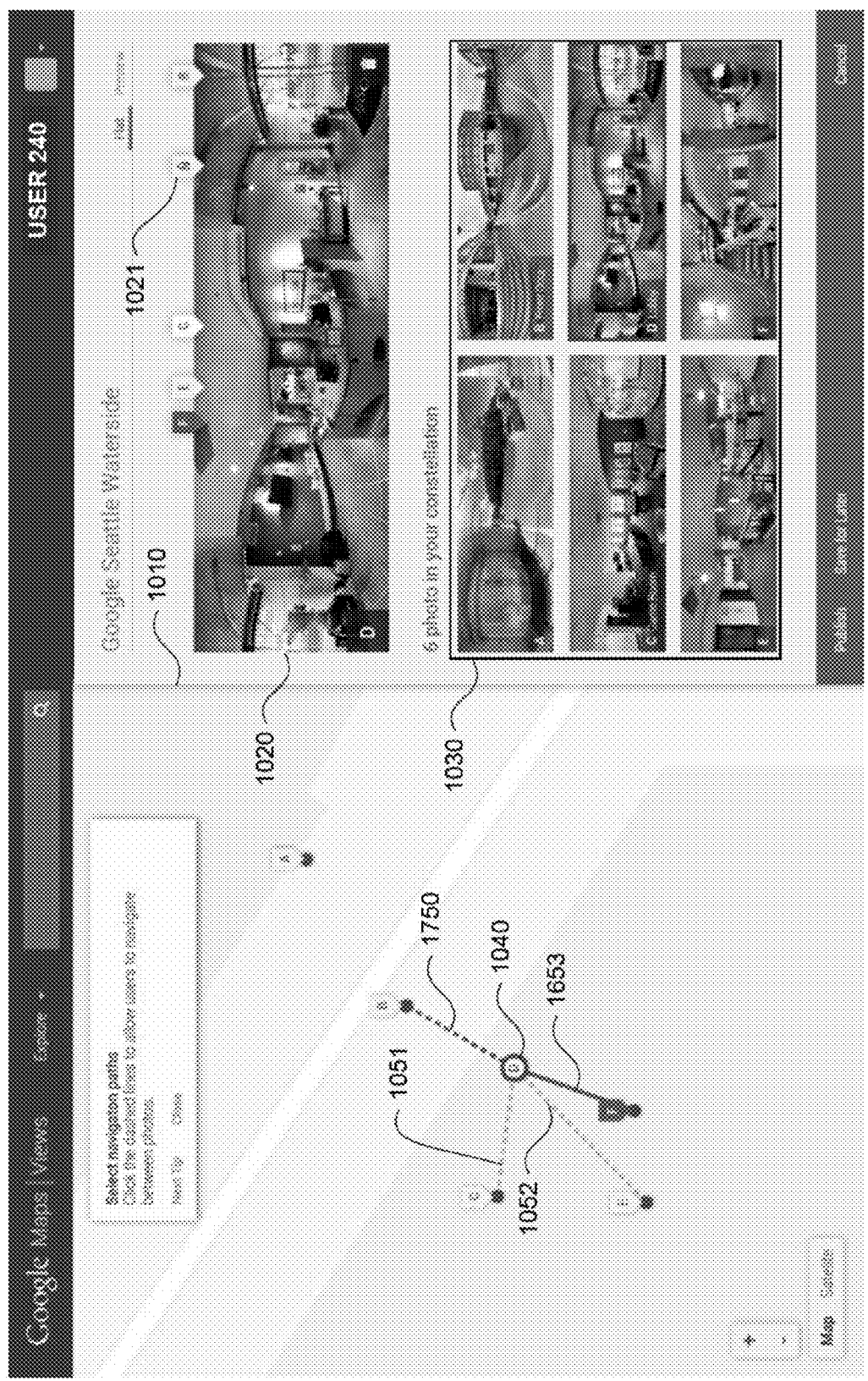
FIG. 17 is a further example screen shot in accordance with aspects of the disclosure.

When the user decides to include the suggested potential path in the constellation, the user may activate a path by selecting it. Again, this selecting may be accomplished by using a mouse pointer, stylus, or a user's finger and a touch screen. Referring again to FIGS. 14 and 15, when the user has selected the suggested potential path 1353, with or without first hovering over this path, the suggested potential path may be converted to an active path between panoramic images D and F. As shown in the example screen shot of FIG. 16, active path 1653 is shown in solid line to indicate that path 1653 is an active path between panoramic images D and F in the constellation. In addition, in FIG. 16, reference marker F may also be shown in a complementary color to the path 1653 to indicate that the active relationship between the reference panoramic image display 1020 and the panoramic image F.

Similar to the examples of FIGS. 15 and 16, FIGS. 17 and 18 demonstrate the activation of suggested potential path 1050 (shown in FIG. 16) between map marker B and the reference map marker D. In the example screen shot 1700 of FIG. 17, the user may again hover over the suggested potential path 1050 such that it is shown as a highlighted path 1750. When the user selects highlighter path 1750 (or un-highlighted path 1050 of FIG. 16), this suggested potential path becomes an active path 1850 in the constellation, as shown in the example screen shot 1800 of FIG. 18. In addition, in FIG. 18, reference marker B may also be shown in a complementary color to the path 1853 to indicate that the active relationship between the reference panoramic image display 1020 and the panoramic image B.

The initial reference panoramic image displayed in the connection view may be selected from the set of panoramic images chosen to be connected by the user. For example, returning to FIG. 12, reference panoramic image display 1020 is a display of panoramic image D of the set of panoramic images. Panoramic image D may be selected as the initial reference panoramic image by randomly selecting this image from the set of panoramic images 1030, by selecting the first or last image taken in time, or by selecting the first image taken by the user.

The reference panoramic image may also be changed. For example, a user may select a map marker (as opposed to grabbing and dragging the map marker in the examples above). Again, this selecting may be accomplished by using a mouse pointer, stylus, or a user's finger and a touch screen. This may automatically cause the panoramic image represented by the selected map marker to become the new reference panoramic image. Thus, an image of the panoramic image represented by the selected map marker may replace the previous reference panoramic image. The new reference panoramic image may also be indicated on the map, for example, by displaying the selected map marker differently from the other map markers.

Figure 18:
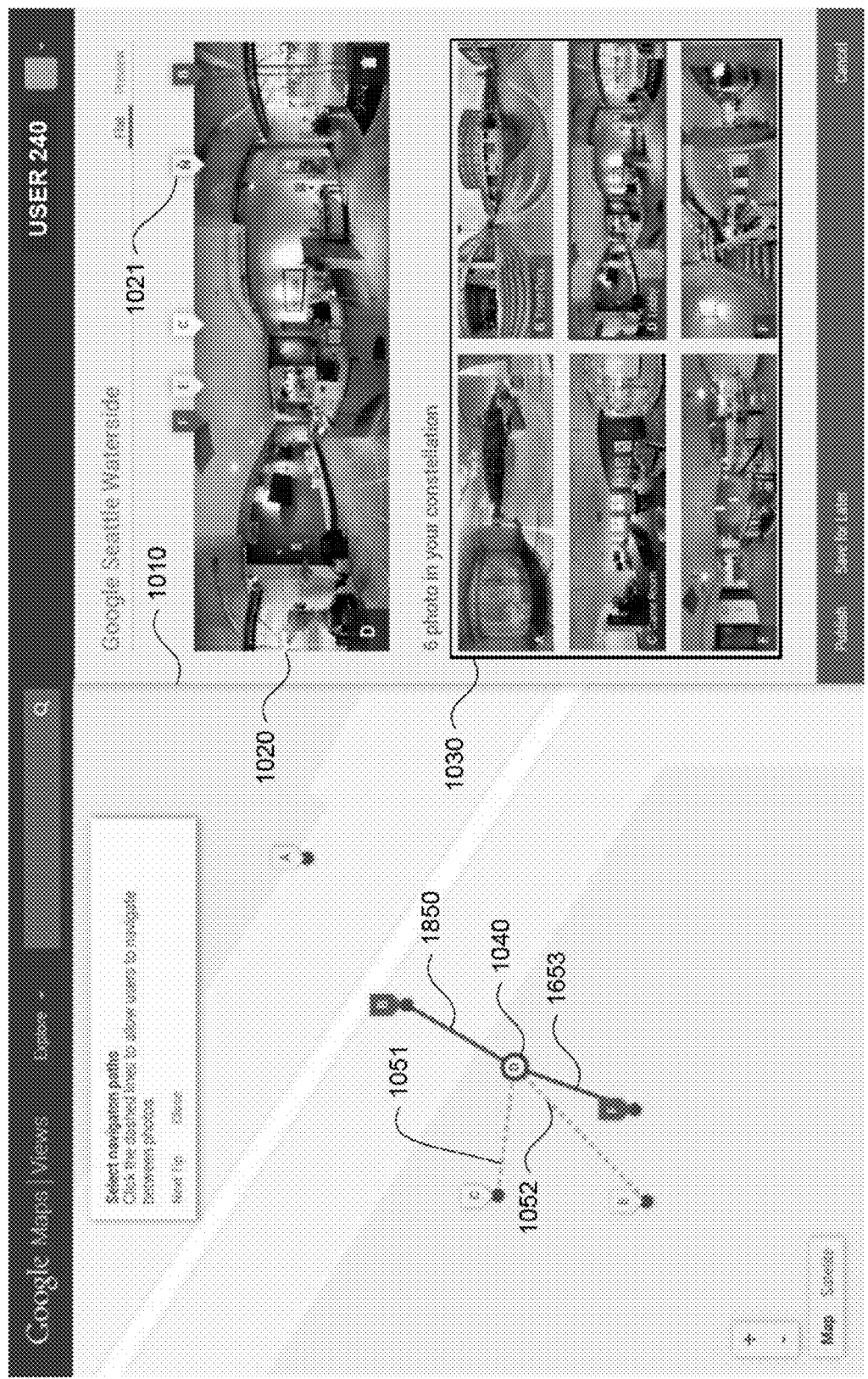
FIG. 18 is an example screen shot in accordance with aspects of the disclosure.

Returning to the example of FIG. 18, the user may select the map marker E. In response, the client computing device 140 may display this map marker as the new reference map marker as shown in screen shot 1900 of FIG. 19. Thus, the new reference map marker 1940 corresponds to the map marker E of FIG. 18. The reference map marker 1040, which represented the geographic location of the panoramic image D relative to the map 1010, has been replaced by a map marker D. Again, reference map marker 1940 is shown differently from the map markers A, B, C, D and F to indicate that panoramic image E is currently set as a reference panoramic image.

In addition, the reference panoramic image display 1020 of panoramic image D has been replaced by the reference panoramic image 1920 representing panoramic image E of the set of panoramic images 1030. The reference panoramic image 1920 includes a wide-angle view of the panoramic image E. Representative panoramic image 1920 also includes a direction marker 1921 indicating the orientation of the representative panoramic image 1920 as well as a plurality of reference markers C, D, and F. As with the previous examples, reference markers may indicate actual or potential relationships between panoramic image D and each of panoramic images C, D, and F of the set of panoramic images 1030 as will be described in more detail below.

Once the reference panoramic image has been changed, the client computing device may display new suggested potential paths. These new suggested potential paths may be identified based on the location and time the panoramic images were captured as described above. In addition, the new reference panoramic image may also be displayed with a set of reference markers indicating the relationship between the new reference panoramic image and other panoramic images of the set of panoramic images to be connected in the constellation.

Figure 19:
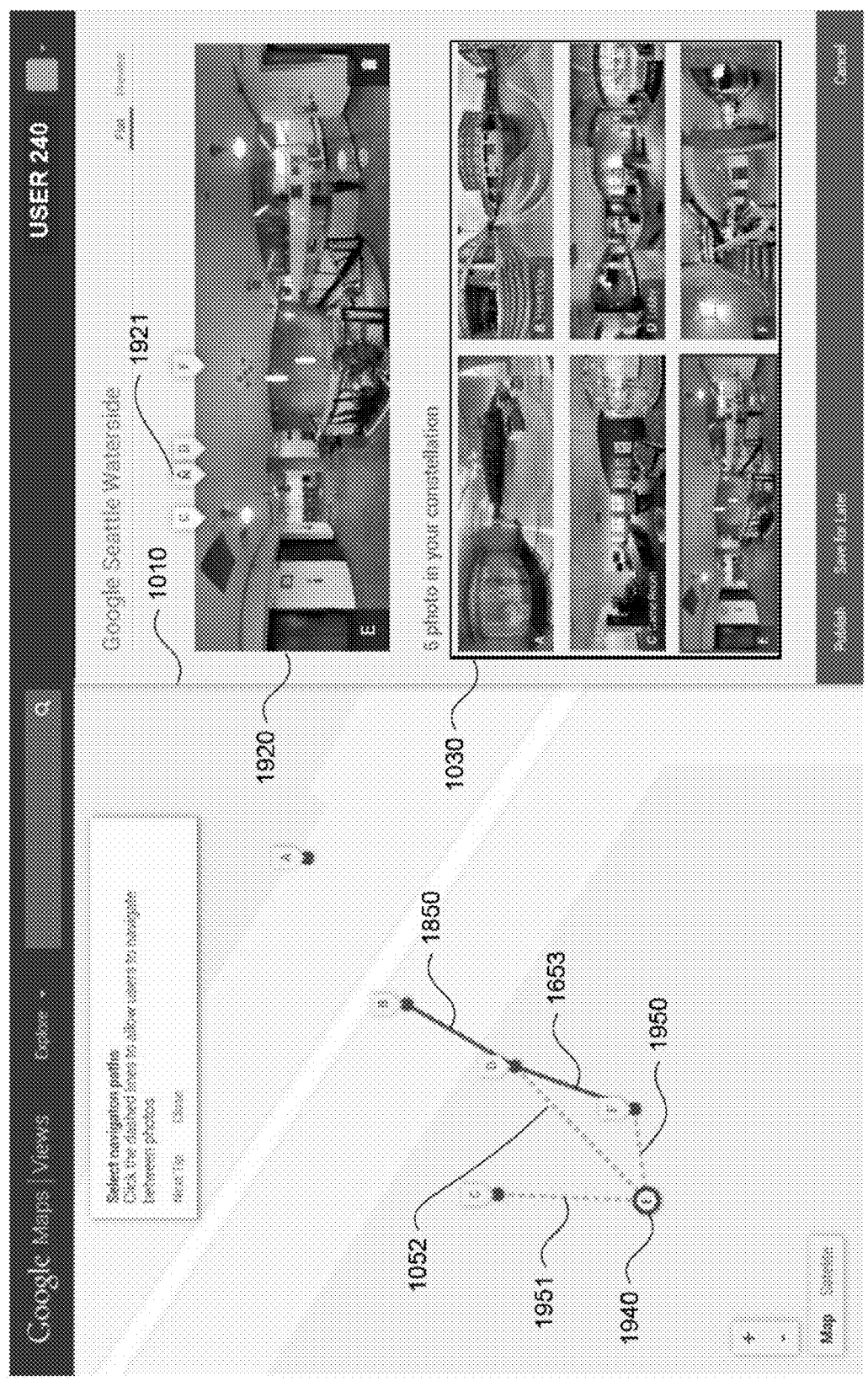
FIG. 19 is another example screen shot in accordance with aspects of the disclosure.

For example, map 1010 of FIG. 19 also includes a plurality of suggested potential paths 1052, 1950, and 1951. Again, these suggested potential paths are shown in dashed line as they have not yet been selected for inclusion in the constellation by the user. In this example, potential path 1052 has not changed from the example of FIG. 18 because this suggested potential path is still available based on the location and time of capture of panoramic images D and E. Suggested paths 1950 and 1951 are newly presented as they connect the reference map marker 1940 with each of map markers F and G, respectively.

As noted above, in addition to selecting the suggested potential paths, the user may also draw paths between map markers. Paths may be drawn by using a mouse pointer, stylus, or a user's finger and a touch screen. For example, as shown in the example screen shot of FIG. 20, the user has drawn a path 2060 between map markers A and B. As a result, the client computing device 140 may create a relationship between panoramic images A and B of the set of panoramic images 1030 corresponding to the path 2060. In addition, in this example, neither panoramic image A or B is required to be the reference panoramic image when the user draws a path between them.

Figure 20:
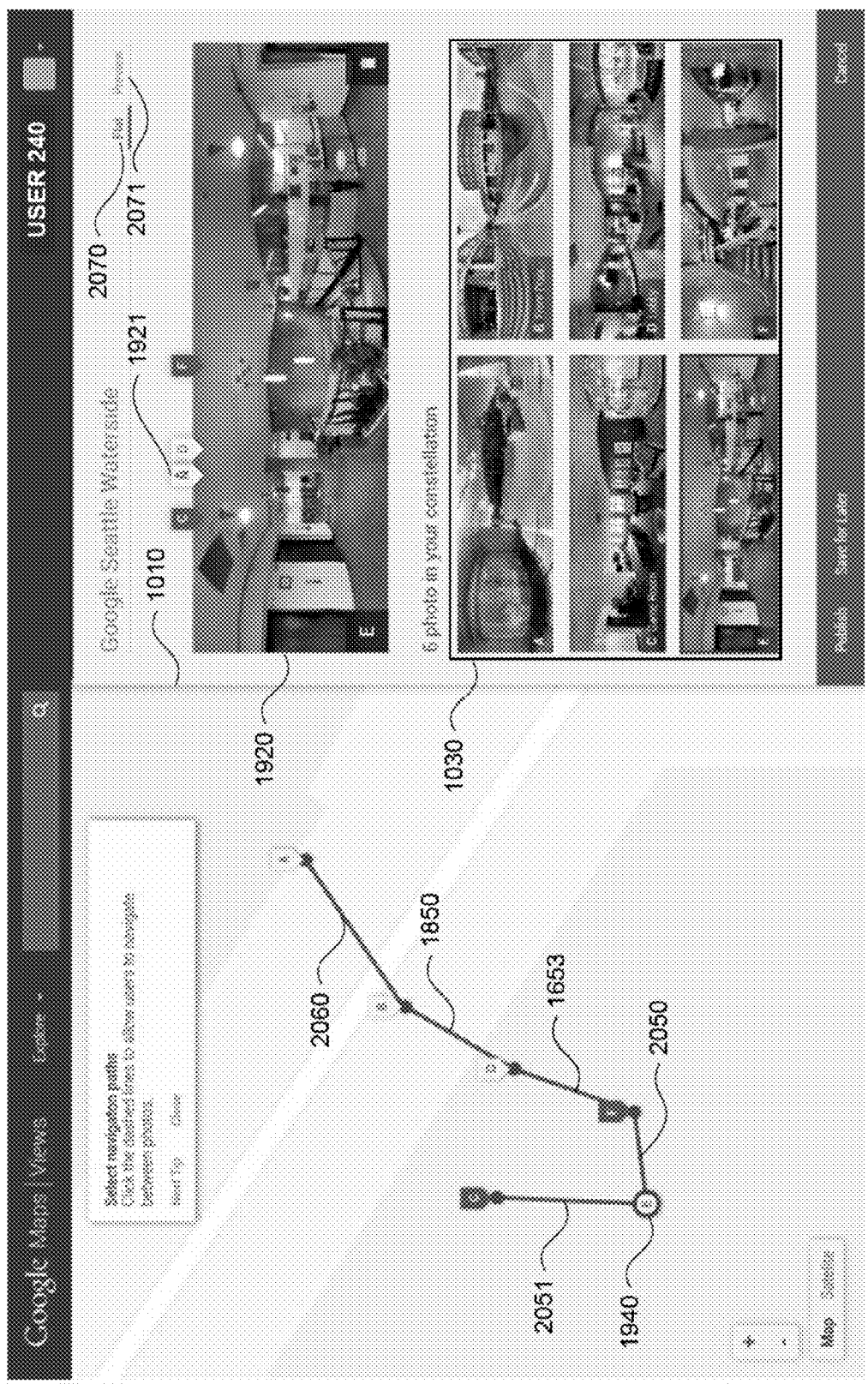
FIG. 20 is a further example screen shot in accordance with aspects of the disclosure.

Once the user has activated or drawn all of the desired connections between the panoramic images of the set of panoramic images, the result may be a constellation or a map representation of the relationships (or connections) between panoramic images. For example, the user may activate suggested potential paths 1950 and 1951 of FIG. 19, and, as shown in FIG. 20, activate paths 2050 and 2051 between the reference map marker 1940 and each of map markers C and F. This may create connections between panoramic images E and C, and panoramic images E and F. As a result, the user has created a constellation comprised of the map markers A-D, and F, reference map marker E, as well as the paths 2060, 1850, 1653, 2050, and 2051 between them.

While in the connection view, the user may also change the type of the reference panoramic image display. This may allow the user to test a navigation experience while creating the constellation. In other words, the user is able to preview the image in the way it would be displayed during the navigation experience. For example, as shown in FIG. 20 the connection view may include two viewing options for the reference panoramic image display: flat option 2070 and preview option 2071. In this example, the flat option 2070 is currently selected, and shown as highlighted. The reference panoramic image, here panoramic image E, is displayed in a wide-angle view so that reference panoramic image includes the entire panoramic image E. In the example screen shot 2100 of FIG. 21, the preview option 2071 is selected, and shown as highlighted. The reference panoramic image display 2120 now includes a preview of the panoramic image E, or that portion of panoramic image E that would be viewed during the navigation experience. In order to provide the user with greater context, in the preview mode, map 1010 may also include orientation indicator 2180 which indicates the portion of panoramic image E displayed in the reference panoramic image display 2120.

Figure 21:
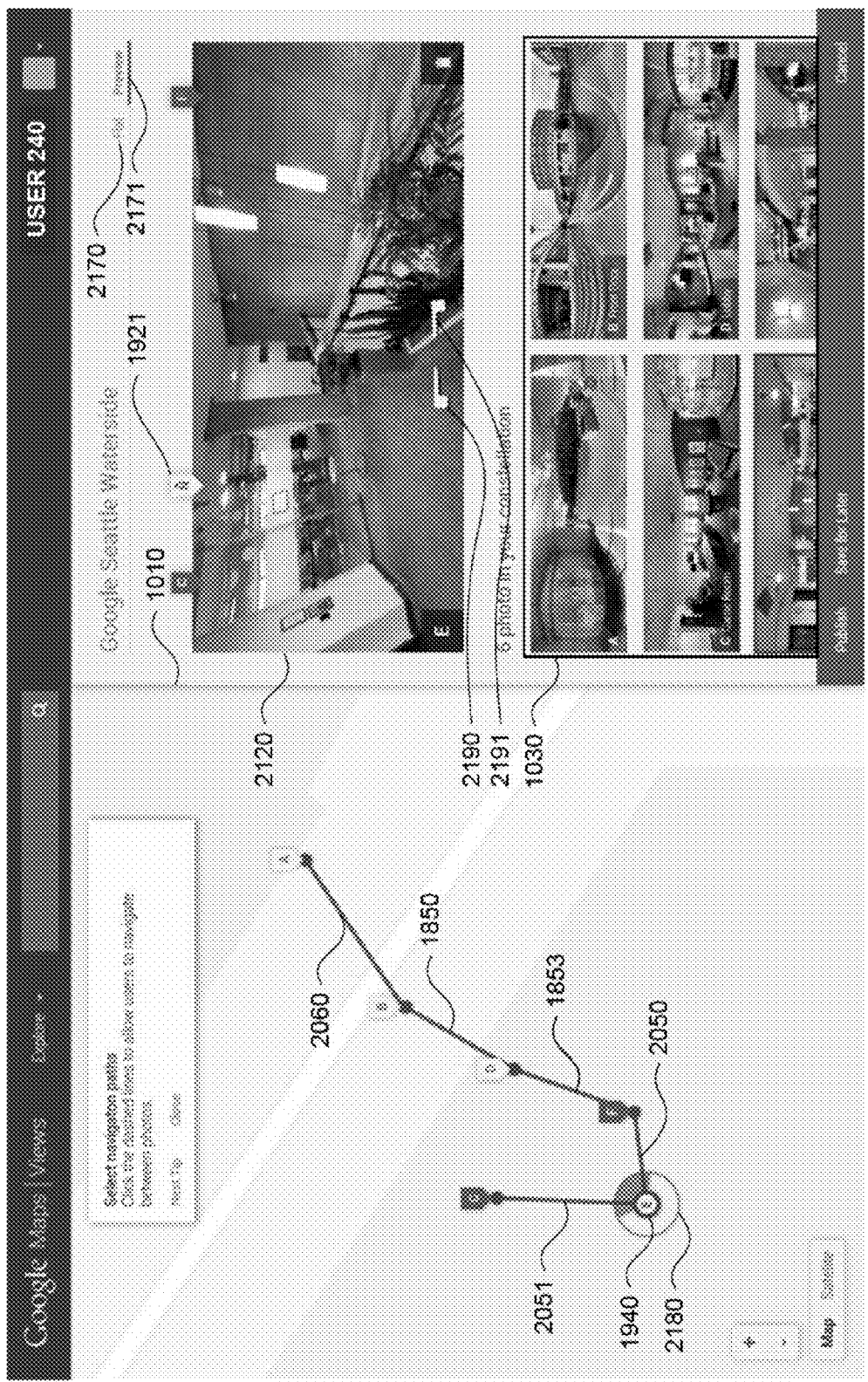
FIG. 21 is an example screen shot in accordance with aspects of the disclosure.
Figure 22:
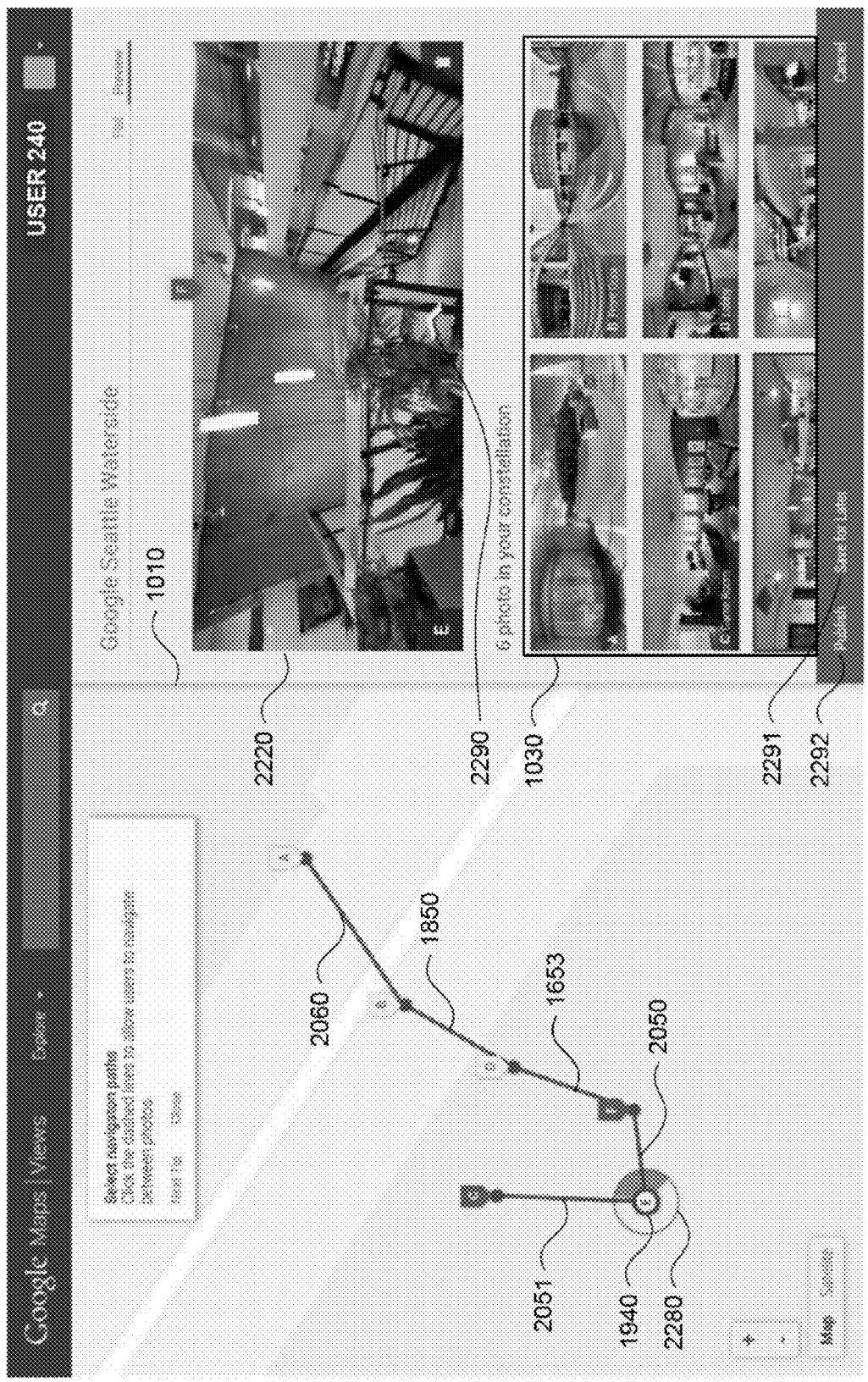
FIG. 22 is another example screen shot in accordance with aspects of the disclosure.

In addition to a preview of a portion of a panoramic image, the user may also navigate in the reference panoramic image display. For example, as shown in FIG. 21, reference panoramic image display 2120 includes navigation arrows 2190 and 2191. By selecting these arrows, the reference panoramic image 1920 may display another portion of panoramic image E. For example, if the user selects navigation arrow 2191, the reference panoramic image 1920 appears to shift to the right as it is replaced by reference panoramic image display 2220 in the example of screen shot 2200 of FIG. 22. In addition, orientation indicator 2180 of FIG. 21 may change to orientation indicator 2280 in FIG. 22 to indicate the change in the portion of panoramic image E displayed in the reference panoramic image display. The user may then continue to "move" to the right in panoramic image E by selecting arrow 2290, etc.

In some aspects, the client computing device may make recommendations of panoramic images to add to the set of panoramic images for connection in the connection view. For example, the connection view may display a notification indicating that there are other panoramic images (for example, from this user or publically available for use in a constellation) available to be connected in the current constellation. This may also include identifying specific panoramic images and a notification such as, "Did you miss this panoramic image?", etc. As another example, the user may have an option to return to his or her panoramic images and select additional images to be included in a set of panoramic images for connection.

The constellation may be saved for later editing or published as navigation data for a completed navigation experience. For example, referring to FIG. 22, the user may select option 2291 or 2292 to save the constellation or publish the constellation as navigation data. Once published, the navigation data, including the panoramic images and the connections among them, may be stored locally at the client computing device and may also be sent to a server computing device, such as one or more of server computing devices 110, for storage as storage system 150.

As noted above, server computing devices may provide the navigation data to client computing devices for display as navigation experiences to users. As an example, one or more of the server computing devices 110 may receive requests from one or more of client computing devices 120, 130 or 140 for a navigation experience. The server computing devices 110 may provide the navigation data to the requesting devices for display to one or more of users 220, 230, or 240 as a navigation experience.

Figure 23:
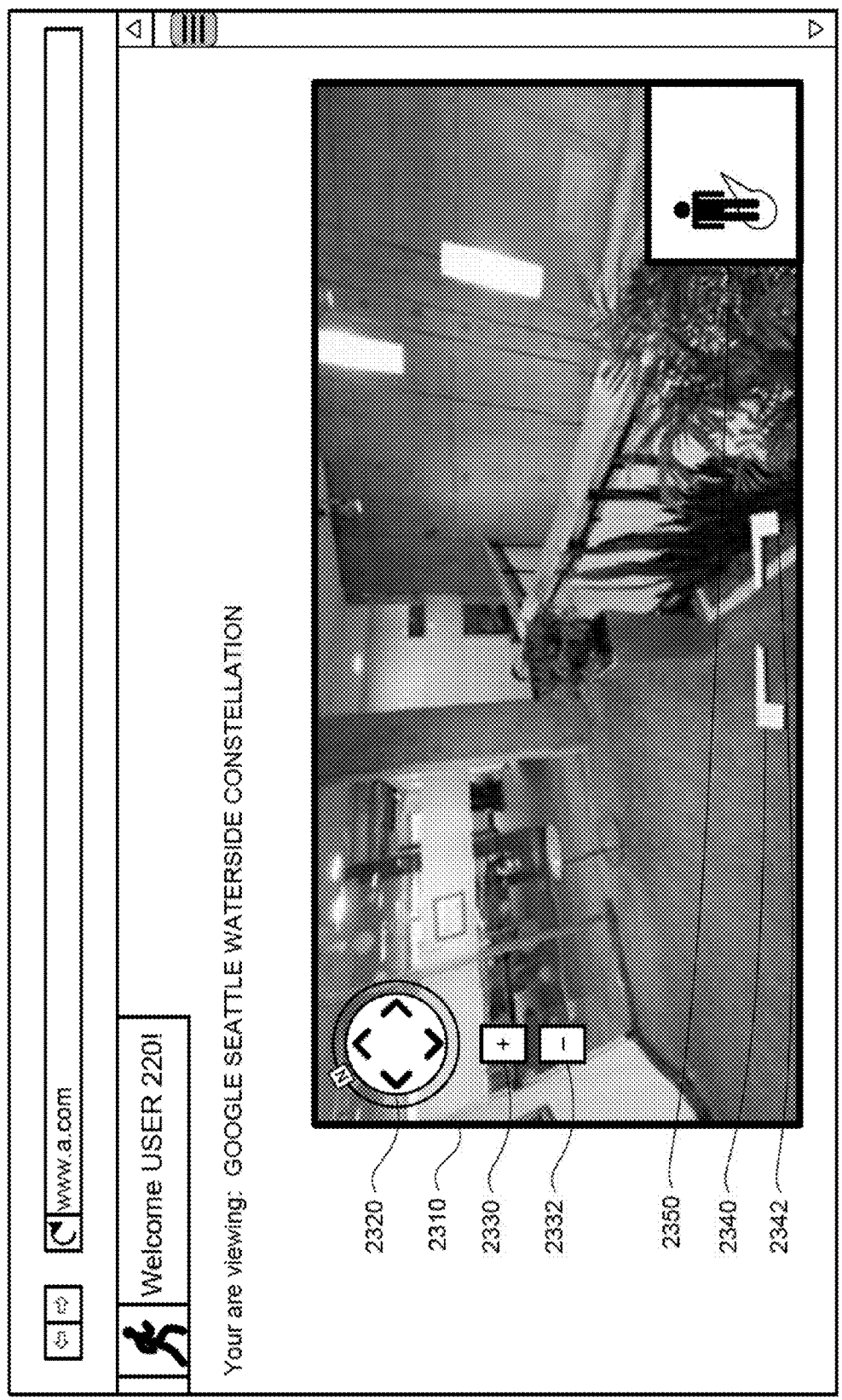
FIG. 23 is a further example screen shot in accordance with aspects of the disclosure.

Screen shot 2300 of FIG. 23 is an example navigation experience. In this example, a user may view a navigation pane 2310 displaying a panoramic image of a constellation entitled "Google Seattle Waterside Constellation." In this example, the navigation pane 2310 provides the user with various navigation tools such as orientation control 2320 for "rotating" in the panoramic image, zoom controls 2330 and 2332 for zooming into the panoramic image, as well as arrows 2340 and 2342 for moving "through" the panoramic image. This example also includes a map pane 2350 which provides the user with some perspective on the viewing position and orientation for the panoramic image.

The navigation data may be sent to the client device as a complete package including all of the panoramic images. In this regard, as the user "moves" to different panoramic images, they may be retrieved from local storage at the user's client computing device. Alternatively, the navigation data may be sent incrementally, for example, in response to a specific navigation request. Thus, as a user "moves" to a different panoramic image, etc., the client computing device may request an additional panoramic image. This request may include navigation information about the current panoramic image and displayed orientation. In response, the server computing device may provide a new panoramic image to the client computing device based on the received navigation information and the navigation data.

In addition, the navigation experience generated using navigation data of a constellation may be incorporated into a larger navigation experience. For example, different navigation data may be interconnected using the connection features described above or linked to locations in other navigation experiences. In this regard, a user may navigate along a roadway in a larger navigation experience, for example a regional or global navigation model, and connect to one or more user-generated navigation experiences. This may provide for additional discovery and continuous navigation beyond the panoramic images connected in a constellation.

The client computing device may also be used to capture the panoramic images. In this regard, the user may first capture the panoramic images using the client computing device and then use the same client computing device to connect the panoramic images into a constellation. As such, if the user has captured a set of panoramic images that share some distance, and in some examples, a time relationship, the client computing device may first determine this and then provide a notification to the user. This notification may prompt the user to connect the images, for example, as discussed above with regard to FIGS. 6 and 7.

Insomuch as various embodiments provide a user with the ability to connect panoramic images into a constellation and publish navigation experiences for other users, the user may be limited to using his or her panoramic images as described above. Similarly, if a user wants to share images privately, or only with a particular set of users, such images may be excluded from constellations as described above. In addition, users may predesignate or identify particular ones of their own panoramic images for which they would like to allow others to use in constellations. In addition, users may also access panoramic images that are publically available for use in a constellation. By doing so, the client computing device may make further recommendations of panoramic images to be added to a set of panoramic images to be connected from these other image sources, again based on the location and time of capture as described above.

Figure 24:
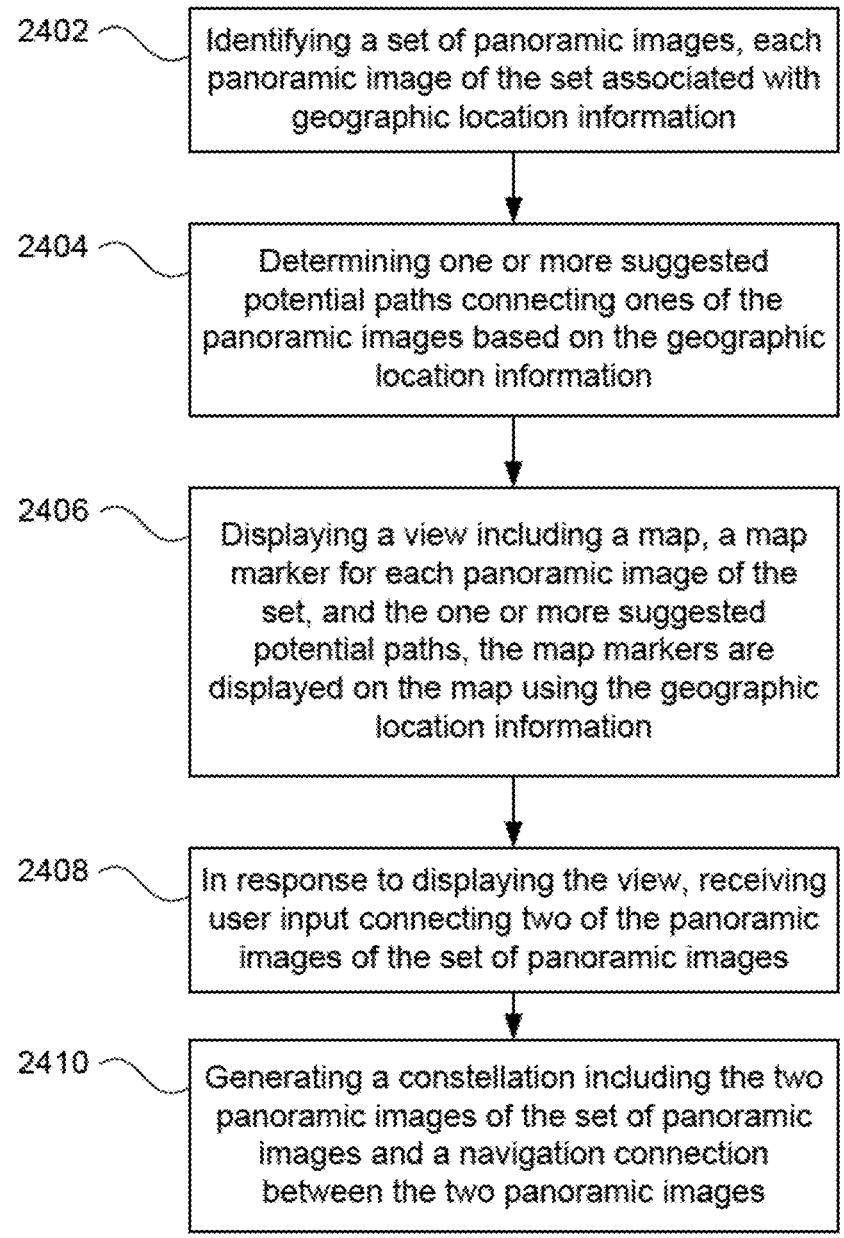
FIG. 24 is a flow diagram in accordance with aspects of the disclosure.

Flow diagram 2400 of FIG. 24 is an example of some of the aspects described above which may be performed by a client computing device, such as client computing device 140. In this example, the client computing device identifies a set of panoramic images, each panoramic image of the set associated with geographic location information at block 2402. The client computing device determines one or more suggested potential paths connecting ones of the panoramic images based on the geographic location information at block 2404. The client computing device displays a view including a map, a map marker for each panoramic image of the set, and the one or more suggested potential paths at block 2406. The map markers are displayed on the map using the geographic location information. In response to displaying the view, the client computing device receives user input connecting two of the panoramic images of the set of panoramic images at block 2408. A constellation, including the two panoramic images of the set of panoramic images and a navigation connection between the two panoramic images, is generated by the client computing device at block 2410.

Figure 25:
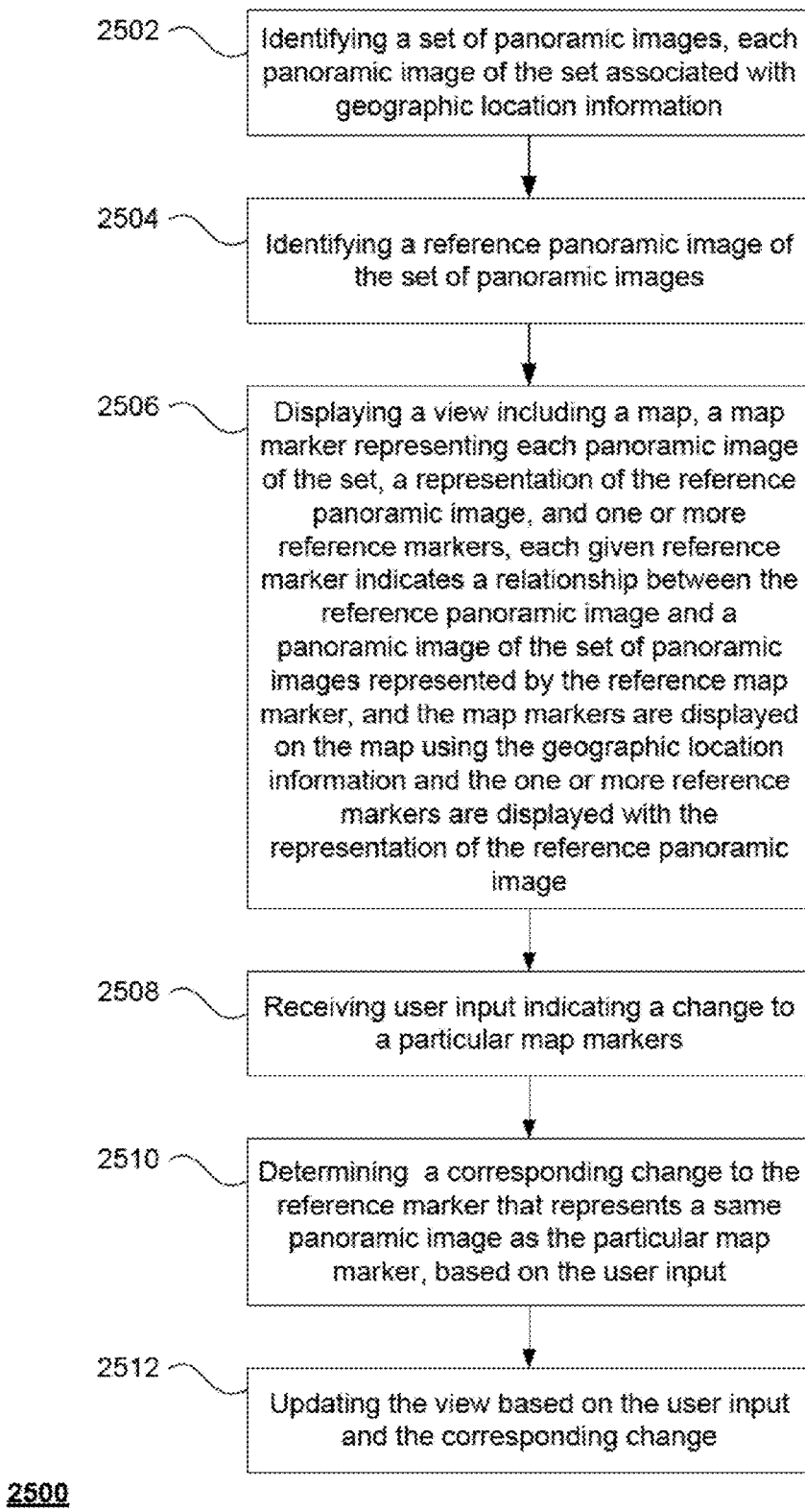
FIG. 25 is another flow diagram in accordance with aspects of the disclosure.

Flow diagram 2500 of FIG. 25 is an example of some of the aspects described above which may be performed by a client computing device, such as client computing device 140. In this example, the client computing device identifies a set of panoramic images, each panoramic image of the set associated with geographic location information at block 2502. The client computing device identifies a reference panoramic image of the set of panoramic images at block 2504. The client computing device displays a view including a map, a map marker representing each panoramic image of the set, a representation of the reference panoramic image, and one or more reference markers at block 2506. Each given reference marker indicates a relationship between the reference panoramic image and a panoramic image of the set of panoramic images represented by the reference map marker. The map markers are displayed on the map using the geographic location information, and the one or more reference markers are displayed with the representation of the reference panoramic image. The client computing device receives user input indicating a change to a particular map marker at block 2508. The client computing device determines a corresponding change to the reference marker that represents a same panoramic image as the particular map marker, based on the user input at block 2510. The client computing device updates the view based on the user input and the corresponding change at block 2512.

Although the aspects and examples described above are discussed as being performed by a client computing device such as client computing device 140, some of all of these aspects and examples may be performed by other devices. For example, some or all of these aspects and examples may be performed by one or more server computing devices such as server computing devices 110. As an example, the recommendations, suggestions, or indications discussed herein may be generated by one or more of the server computing devices 110 and sent to the client computing device 140 over network 160 for display to user 250.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server, such as one or more of server computing devices 110.

Most of the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. As an example, the preceding operations do not have to be performed in the precise order described above. Rather, various steps can be handled in a different order or simultaneously. Steps can also be omitted unless otherwise stated. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A computer-implemented method comprising:
identifying, by one or more computing devices, a set of panoramic images, each panoramic image of the set of panoramic images being associated with geographic location information;
determining, by the one or more computing devices, suggested potential paths, each path connecting two of the panoramic images based on a geographic proximity and an angular proximity of the two panoramic images to each other, wherein for each suggested potential path, the location of at least one of the two panoramic images is different from the location of at least one panoramic image of every other suggested potential path;
providing for display, by the one or more computing devices, a view including a map, a map marker for each panoramic image of the set, and a plurality of the suggested potential paths in order to show that a link between the two panoramic images connected by each suggested potential path is not yet created, the map markers being displayed at locations on the map that are determined based at least in part on using the geographic location information;
after providing the view for display, receiving, by the one or more computing devices, user input selecting at least one path from the plurality of suggested potential paths;
based on the received user input, establishing, by the one or more computing devices, the link between each two panoramic images of each selected path; and
generating, by the one or more computing devices, navigation data for a navigation experience, the navigation data including each two panoramic images of each selected path and a navigation connection between the two panoramic images of each selected path, and between each selected path and any other selected path which shares the same panoramic image.

2. The method of claim 1, further comprising:
identifying a particular panoramic image of the set of panoramic images as a reference panoramic image, and
wherein the suggested potential paths are determined such that they extend between the map marker of the reference panoramic image and a map marker of a panoramic image of the set of panoramic images different from the map marker of the reference panoramic image.

3. The method of claim 2, wherein one or more of the suggested potential paths are determined further based on an angular distance between panoramic images of the set of panoramic images relative to the map marker of the reference panoramic image.

4. The method of claim 2, further comprising:
receiving identification of a second panoramic image of the set of panoramic images as a new reference panoramic image, and
determining, by the one or more computing devices, one or more new suggested potential paths connecting the map marker of the new reference panoramic image and a map marker of a panoramic image of the set of panoramic images different from the map marker of the new reference panoramic image.

5. The method of claim 2, further comprising:
receiving user input indicating updated geographic location information of a particular map marker of the set of panoramic images different from the map marker of the reference panoramic image;
associating, by the one or more computing devices, the received updated geographic location information with the particular map marker;
determining, by the one or more computing devices, a new suggested potential path connecting the map marker of the reference panoramic image and the particular map marker; and updating the display of the view with the new suggested potential path and the updated geographic location information of the particular map marker.

6. The method of claim 1, wherein:
each of the panoramic images of the set of panoramic images are associated with timestamp information; and
the suggested potential paths are determined further based on the timestamp information.

7. The method of claim 1, wherein the user input indicates that the user has drawn a line between the map markers of the two of the panoramic images of the selected path, and the method further comprises generating the navigation connection based on the user input.

8. The method of claim 1, wherein the user input indicates that the user has activated one of the suggested potential paths, and the method further comprises generating the navigation connection based on the user input.

9. The method of claim 1, further comprising:
receiving, from a client computing device, a request for a navigation experience; and
sending, to the client computing device, the navigation data for display as a navigation experience.

10. A system comprising one or more computing devices configured to:
identify a set of panoramic images, each panoramic image of the set of panoramic images being associated with geographic location information;
determine suggested potential paths, each path connecting two of the panoramic images based on a geographic proximity and an angular proximity of the two panoramic images to each other, wherein for each suggested potential path, the location of at least one of the two panoramic images is different from the location of at least one panoramic image of every other suggested potential path;
provide for display a view including a map, a map marker for each panoramic image of the set, and a plurality of the suggested potential paths in order to show that a link between the two panoramic images connected by each suggested path is not yet created, the map markers being displayed at locations on the map that are determined based at least in part on using the geographic location information;
after providing for display the view, receive user input selecting at least one path from the plurality of suggested potential paths;
based on the received user input, establish the link between each two panoramic images of each selected path; and
generate navigation data for a navigation experience, the navigation data including each two panoramic images of each selected path and a navigation connection between the two panoramic images, and between each selected path and any other selected path which shares the same panoramic image.

11. The system of claim 10 wherein the one or more computing devices are further configured to:
receive, from a client computing device, a request for a navigation experience; and
send, to the client computing device, a panoramic image based on the navigation data.

12. The system of claim 10 wherein the one or more computing devices are further configured to identify the set of panoramic images by receiving user input selecting an individual panoramic image of the set of panoramic images.

13. The system of claim 12 wherein the one or more computing devices are further configured to, in response to receiving user input selecting a particular panoramic image, generate a notification that the particular panoramic image is not available for connections to other images.

14. The system of claim 12 wherein the one or more computing devices are further configured to:
display a second view including a plurality of panoramic images; and
in response to receiving user input selecting a given panoramic image of the plurality of panoramic images that is also in the set of panoramic images, indicate whether any of the plurality of panoramic images are available.

15. The system of claim 14 wherein the one or more computing devices are further configured to determine whether any of the plurality of panoramic images is available based on timestamp information associated with each of the plurality of panoramic images.

16. The system of claim 14 wherein the one or more computing devices are further configured to determine whether any of the plurality of panoramic images is available based on geographic location information associated with each of the plurality of panoramic images.

17. The system of claim 10 wherein the one or more computing devices are further configured to:
determine the set of panoramic images based on the geographic location information associated with each panoramic image of the set of panoramic images;
provide a notification that the set of panoramic images are available for connection; and
identify the set of panoramic images further based on user input received in response to the notification.

18. The system of claim 10 wherein the one or more computing devices are further configured to:
display a second view including a second map, the second map including a plurality of markers, each marker of the plurality of markers representing a panoramic image; and
identify the set of panoramic images further based on the panoramic images represented by the plurality of markers in the second view.

19. The system of claim 10 wherein the one or more computing devices are further configured to:
display a second view including a second map at a first zoom level, the second map including a plurality of markers, each marker of the plurality of markers representing a panoramic image;
in response to user input, display a third map at a predetermined zoom level in the second view, the third map including a second plurality of markers, each marker of the second plurality of markers representing a panoramic image;
when the third map is displayed at the predetermined zoom level, provide a notification that the set of panoramic images are available for connection; and
identify the set of panoramic images further based on user input received in response to the notification.

20. A non-transitory, tangible computer-readable storage device on which computer readable instructions of a program are stored, the instructions, when executed by one or more processors, cause the processors to perform a method, the method comprising:
identifying a set of panoramic images, each panoramic image of the set of panoramic images being associated with geographic location information;
determining suggested potential paths, each path connecting two of the panoramic images based on a geographic proximity and an angular proximity of the two panoramic images to each other, wherein for each suggested potential path, the location of at least one of the two panoramic images is different from the location of at least one panoramic image of every other suggested potential path;

providing for display, a view including a map, a map marker for each panoramic image of the set, and a plurality of the suggested potential paths in order to show that a link between the two panoramic images connected by each suggested potential path is not yet created, the map markers being displayed at locations on the map that are determined based at least in part on using the geographic location information;

after providing the view for display, receiving user input selecting at least one path from the plurality of suggested potential paths;

based on the received user input, establishing the link between each two panoramic images of each selected path; and generating navigation data for a navigation experience, the navigation data including each two panoramic images of each selected path and a navigation connection between the two panoramic images of each selected path, and between each selected path and any other selected path which shares the same panoramic image.

* * * * *